(12) United States Patent
Presz, Jr. et al.

(10) Patent No.: US 8,622,688 B2
(45) Date of Patent: Jan. 7, 2014

(54) FLUID TURBINE

(75) Inventors: Walter M. Presz, Jr., Wilbraham, MA (US); Michael J. Werle, West Hartford, CT (US); Thomas J. Kennedy, III, Wilbraham, MA (US); William Scott Keeley, Charleston, RI (US); Robert H. Dold, Monson, MA (US)

(73) Assignee: FloDesign Wind Turbine Corp., Waltham, MA (US)

( * ) Notice: Subject to any disclaimer, the term of this patent is extended or adjusted under 35 U.S.C. 154(b) by 519 days.

(21) Appl. No.: 13/016,437

(22) Filed: Jan. 28, 2011

(65) Prior Publication Data

US 2011/0187110 A1    Aug. 4, 2011

Related U.S. Application Data

(63) Continuation-in-part of application No. 12/749,341, filed on Mar. 29, 2010, which is a continuation-in-part of application No. 12/054,050, filed on Mar. 24, 2008, now Pat. No. 8,021,100, said application No. 12/749,341 is a continuation-in-part of application No. 12/425,358, filed on Apr. 16, 2009, now Pat. No. 8,376,686, which is a continuation-in-part of application No. 12/053,695, filed on Mar. 24, 2008, said application No. 12/425,358 is a continuation-in-part of application No. 12/629,714, filed on Dec. 2, 2009, now Pat. No. 8,482,142, application No. 13/016,437, which is a continuation-in-part of application No. 12/749,951, filed on Mar. 30, 2010, now Pat. No. 8,573,933, and a continuation-in-part of application No. 12/054,050, application No. 13/016,437, which is a continuation-in-part of application No. 12/828,698, filed on Jul. 1, 2010, and a continuation-in-part of application No. 12/054,050, and a continuation-in-part of application No. 12/629,714, application No. 13/016,437, which is a continuation-in-part of application No. 12/793,931, filed on Jun. 4, 2010, which is a continuation-in-part of application No. 12/054,050, said application No. 12/793,931 is a continuation-in-part of application No. 12/054,050.

(60) Provisional application No. 61/299,206, filed on Jan. 28, 2010, provisional application No. 60/919,588, filed on Mar. 23, 2007, provisional application No. 61/124,397, filed on Apr. 16, 2008, provisional application No. 61/119,078, filed on Dec. 2, 2008, provisional application No. 61/164,509, filed on Mar. 30, 2009, provisional application No. 61/222,142, filed on Jul. 1, 2009, provisional application No. 61/184,026, filed on Jun. 4, 2009.

(51) Int. Cl.
*F03D 7/02* (2006.01)

(52) U.S. Cl.
USPC ........................................................... 415/4.3

(58) Field of Classification Search
USPC ........... 415/2.1, 4.1, 4.3, 4.5, 227; 290/44, 55
See application file for complete search history.

(56) References Cited

U.S. PATENT DOCUMENTS

| | | |
|---|---|---|
| 1,312,021 A | 8/1919 | Dickinson et al. |
| 3,435,654 A | 4/1969 | Papst |
| 3,648,800 A | 3/1972 | Hoerst |
| 3,986,787 A | 10/1976 | Mouton et al. |
| 4,021,135 A | 5/1977 | Pederson et al. |
| 4,038,848 A | 8/1977 | Ichriyu et al. |
| 4,075,500 A | 2/1978 | Oman et al. |
| 4,077,206 A | 3/1978 | Ayyagari |
| 4,140,433 A | 2/1979 | Eckel |
| 4,166,596 A | 9/1979 | Mouton, Jr. et al. |
| 4,204,799 A | 5/1980 | de Geus |
| 4,320,304 A | 3/1982 | Karlsson et al. |
| 4,324,985 A | 4/1982 | Oman |
| 4,482,290 A | 11/1984 | Foreman et al. |
| 4,516,907 A | 5/1985 | Edwards |
| 4,548,034 A | 10/1985 | Maguire |
| 4,720,640 A | 1/1988 | Anderson et al. |
| 4,781,522 A | 11/1988 | Wolfram |
| 4,786,016 A | 11/1988 | Presz, Jr. et al. |

| | | |
|---|---|---|
| 5,083,899 A | 1/1992 | Koch |
| 5,110,560 A | 5/1992 | Presz, Jr. et al. |
| 5,213,138 A | 5/1993 | Presz, Jr. |
| 5,230,369 A | 7/1993 | Presz, Jr. |
| 5,230,656 A | 7/1993 | Paterson et al. |
| 5,327,940 A | 7/1994 | Presz, Jr. |
| 5,440,875 A | 8/1995 | Torkelson et al. |
| 5,447,412 A | 9/1995 | Lamont |
| 5,464,320 A * | 11/1995 | Finney ............................ 415/60 |
| 5,506,453 A | 4/1996 | McCombs |
| 5,554,472 A | 9/1996 | Aizawa |
| 5,761,900 A | 6/1998 | Presz, Jr. |
| 5,836,738 A | 11/1998 | Finney |
| 5,884,472 A | 3/1999 | Presz, Jr. et al. |
| 5,947,678 A | 9/1999 | Bergstein |
| 5,992,140 A | 11/1999 | Hammond et al. |
| 6,016,651 A | 1/2000 | Hammond et al. |
| 6,082,635 A | 7/2000 | Seiner et al. |
| 6,127,739 A | 10/2000 | Appa |
| 6,168,373 B1 | 1/2001 | Vauthier |
| 6,233,920 B1 | 5/2001 | Presz, Jr. et al. |
| 6,276,127 B1 | 8/2001 | Alberti |
| 6,278,197 B1 | 8/2001 | Appa |
| 6,311,928 B1 | 11/2001 | Presz, Jr. et al. |
| 6,382,904 B1 | 5/2002 | Oriov et al. |
| 6,402,477 B1 | 6/2002 | Cybularz et al. |
| 6,655,907 B2 | 12/2003 | Brock et al. |
| 6,659,719 B2 | 12/2003 | Angelis |
| 6,812,587 B2 | 11/2004 | Gilbreth et al. |
| 6,841,892 B1 | 1/2005 | Le Nabour et al. |
| 6,854,260 B2 | 2/2005 | Anderson |
| 6,858,962 B2 | 2/2005 | Post |
| 6,877,960 B1 | 4/2005 | Presz, Jr. et al. |
| 6,887,031 B1 | 5/2005 | Tocher |
| 7,017,331 B2 | 3/2006 | Anderson |
| 7,045,913 B2 | 5/2006 | Ebrahim et al. |
| 7,111,448 B2 | 9/2006 | Anderson |
| 7,116,010 B2 | 10/2006 | Lasseter et al. |
| 7,144,216 B2 | 12/2006 | Hessel |
| D543,495 S | 5/2007 | Williams |
| 7,218,011 B2 | 5/2007 | Hiel et al. |
| 7,220,096 B2 | 5/2007 | Tocher |
| 7,251,927 B2 | 8/2007 | Anderson |
| 7,256,512 B1 | 8/2007 | Marquiss |
| 7,270,043 B2 | 9/2007 | Presz, Jr. et al. |
| 7,303,369 B2 | 12/2007 | Rowan et al. |
| 7,531,933 B2 | 5/2009 | Miyata et al. |
| 7,600,963 B2 * | 10/2009 | Miller ............................ 415/4.3 |
| 7,619,332 B2 | 11/2009 | Kimura et al. |
| 7,874,788 B2 | 1/2011 | Stothers et al. |
| 7,964,978 B1 | 6/2011 | Weissmann |
| 8,021,100 B2 | 9/2011 | Presz, Jr. et al. |
| 2003/0137149 A1 | 7/2003 | Northrup et al. |
| 2003/0227172 A1 | 12/2003 | Erdman et al. |
| 2004/0005226 A1 | 1/2004 | Smith, III |
| 2004/0156710 A1 | 8/2004 | Gaskell |
| 2005/0207881 A1 | 9/2005 | Tocher |
| 2006/0151633 A1 | 7/2006 | Presz, Jr. et al. |
| 2007/0018459 A1 | 1/2007 | Williams |
| 2007/0040385 A1 | 2/2007 | Uchiyama |
| 2008/0150484 A1 | 6/2008 | Kimball et al. |
| 2008/0232957 A1 | 9/2008 | Presz, Jr. et al. |
| 2009/0087308 A2 | 4/2009 | Presz, Jr. et al. |
| 2009/0206611 A1* | 8/2009 | Gilbert ............................ 290/55 |
| 2009/0214338 A1 | 8/2009 | Werle et al. |
| 2009/0263244 A1 | 10/2009 | Presz, Jr. et al. |
| 2010/0133839 A1 | 6/2010 | Bridwell |
| 2011/0031760 A1 | 2/2011 | Lugg |
| 2011/0291413 A1 | 12/2011 | Wamble, III et al. |

FOREIGN PATENT DOCUMENTS

| | | |
|---|---|---|
| EP | 1 885 047 B1 | 12/2008 |
| JP | 63-029063 | 2/1988 |
| JP | 2002-242812 | 8/2002 |
| JP | 2003-328921 A | 11/2003 |
| JP | 2005-502821 | 1/2005 |
| JP | 3138373 | 12/2007 |
| RU | 2147693 C1 | 4/2000 |
| WO | WO 03/025385 A2 | 3/2003 |
| WO | WO 03/081031 A1 | 10/2003 |
| WO | WO 2004/059814 A2 | 7/2004 |
| WO | WO 2004/099607 A2 | 11/2004 |
| WO | WO 2006/029496 A1 | 3/2006 |
| WO | WO 2007/132303 A1 | 11/2007 |
| WO | 2008130940 A1 | 10/2008 |
| WO | WO 2008/118405 A2 | 10/2008 |
| WO | 2009129309 A2 | 10/2009 |

OTHER PUBLICATIONS

Future Energy Solutions, Inc.'s Wind Tamer Turbines video demonstration found on Future Energy Solutions, Inc.'s website http://www.windtamerturbines.com/about-wind-tamer-turbines.asp, Oct. 8, 2008, Livonia, NY.
English Transition of RU 2147693 C1, FLS, Inc. Aug. 2010, 17 pgs.
http://en.wikipedia.org/wiki/Permanent_magnet_synchronous_generator, "Permanent Magnet Synchronous Generator", Oct. 22, 2009, 2 pages.
http://en.wikipedia.org/wiki/Ultracapacitor, "Electric Double-Layer Capacitor", Oct. 22, 2009, 7 pgs.
Igra, O., "Shrouds for Aerogenerators," AIAA Journal, Oct. 1976, pp. 1481-1483. vol. 14, No. 10.
International Search Report and Written Opinion of PCT/US2009/040874 mailed Aug. 28, 2009, 16 pgs.
International Search Report and Written Opinion of PCT/US2010/029079 mailed May 21, 2010, 8 pgs.
International Search Report and Written Opinion of PCT/US2010/029156 mailed May 24, 2010, 13 pgs.
PCT International Search Report International Application No. PCT/US2011/022962, International Filing Date: Jan. 28, 2011, 2 pages.
International Search Report for International Application No. PCT/US2011/022962 dated Apr. 19, 2011 (2 pages).
International Preliminary Report on Patentability for International Application No. PCT/US2011/022962 dated Jul. 31, 2012 (6 pages).
http://en.wikipedia.org/wiki/Permanent_magnet_synchronous_generator, "Permanent Magnet Synchronous Generator", downloaded Oct. 22, 2009, 2 pages.
Jamieson, Peter M. "Beating Betz: Energy Extraction Limits in a Constrained Flow Field," J. Sol. Energy Eng. 131(3), 031008-1 (Aug. 2009), (6 pages).

* cited by examiner

*Primary Examiner* — Richard Edgar
(74) *Attorney, Agent, or Firm* — McCarter & English, LLP

(57) ABSTRACT

A fluid turbine comprises a turbine shroud, an ejector shroud, and a means for extracting energy from a fluid stream. The means for extracting energy is located in the annulus between the turbine shroud and the ejector shroud. High-energy fluid can flow through the turbine shroud to bypass the means for extracting energy. Energy is extracted from the fluid passing through the means to form a low-energy fluid stream. The high-energy fluid and the low-energy fluid can then be mixed. The turbine shroud and/or the ejector shroud has mixing lobes to increase the mixing of the two fluid streams.

20 Claims, 17 Drawing Sheets

FLUID TURBINE

This application claims priority to U.S. Provisional Patent Application Ser. No. 61/299,206, filed Jan. 28, 2010. This application is also a continuation-in-part of U.S. patent application Ser. No. 12/749,341, filed Mar. 29, 2010, which claimed priority from three different applications. First, U.S. patent application Ser. No. 12/749,341 is a continuation-in-part of U.S. patent application Ser. No. 12/054,050, filed Mar. 24, 2008, now U.S. Pat. No. 8,021,100 which claimed priority to U.S. Provisional Patent Application Ser. No. 60/919,588, filed Mar. 23, 2007. Second, U.S. patent application Ser. No. 12/749,341 is also a continuation-in-part of U.S. patent application Ser. No. 12/425,358, filed Apr. 16, 2009, now U.S. Pat. No. 8,376,686 which is a continuation-in-part of U.S. patent application Ser. No. 12/053,695, filed Mar. 24, 2008, which claimed priority to U.S. Provisional Patent Application Ser. No. 60/919,588, filed Mar. 23, 2007. U.S. patent application Ser. No. 12/425,358 also claimed priority to U.S. Provisional Patent Application Ser. No. 61/124,397, filed Apr. 16, 2008. Third, U.S. patent application Ser. No. 12/749,341 is also a continuation-in-part of U.S. patent application Ser. No. 12/629,714, filed Dec. 2, 2009, now U.S. Pat. No. 8,482,142 which claimed priority to U.S. Provisional Patent Application Ser. No. 61/119,078, filed Dec. 2, 2008. This application is also a continuation-in-part of U.S. patent application Ser. No. 12/749,951, filed Mar. 30, 2010, now U.S. Pat. No. 8,573,933 which claimed priority to U.S. Provisional Patent Application Ser. No. 61/164,509, filed Mar. 30, 2009. U.S. patent application Ser. No. 12/749,951 is also a continuation-in-part from U.S. patent application Ser. No. 12/054,050, filed Mar. 24, 2008, now U.S. Pat. No. 8,021,100 which claimed priority from U.S. Provisional Patent Application Ser. No. 60/919,588, filed Mar. 23, 2007. This application is also a continuation-in-part of U.S. patent application Ser. No. 12/828,698, filed Jul. 1, 2010, which claimed priority from three different applications. First, U.S. patent application Ser. No. 12/828,698 claimed priority to U.S. Provisional Patent Application Ser. No. 61/222,142, filed Jul. 1, 2009. Second, application Ser. No. 12/828,698 is also a continuation-in-part from U.S. patent application Ser. No. 12/054,050, filed Mar. 24, 2008. now U.S. Pat. No. 8,021,100 Third, U.S. patent application Ser. No. 12/828,698 is also a continuation-in-part from U.S. patent application Ser. No. 12/629,714, filed Dec. 2, 2009, now U.S. Pat. No. 8,482,142 which claimed priority from U.S. Provisional Patent Application Ser. No. 61/119,078, filed Dec. 2, 2008. This application is also a continuation-in-part of U.S. patent application Ser. No. 12/793,931, filed Jun. 4, 2010, which claimed priority to two different applications. First, U.S. patent application Ser. No. 12/793,931 is a continuation-in-part application of U.S. patent application Ser. No. 12/054,050, filed Mar. 24, 2008, now U.S. Pat. No. 8,021,100 which claimed priority from U.S. Provisional Patent Application Ser. No. 60/919,588, filed Mar. 23, 2007. Second, U.S. patent application Ser. No. 12/793,931 claimed priority to U.S. Provisional Patent Application Ser. No. 61/184,026, filed Jun. 4, 2009. Finally, this application is also a continuation-in-part of U.S. patent application Ser. No. 12/054,050, filed Mar. 24, 2008, now U.S. Pat. No. 8,021,100 which claimed priority to U.S. Provisional Patent Application Ser. No. 60/919,588, filed Mar. 23, 2007. The disclosure of each of these applications is fully incorporated by reference herein in its entirety.

BACKGROUND

This present disclosure relates to horizontal axis shrouded fluid turbines. In particular, the shrouded fluid turbines include two shrouds, a turbine shroud and an ejector shroud. An impeller is located in the annulus between the turbine shroud and the ejector shroud to extract energy from fluid passing between the two shrouds. Fluid flows through the turbine shroud and bypasses the impeller. Low-energy fluid exiting the impeller is mixed with other high-energy fluid streams to improve the efficiency of the fluid turbine energy extraction system. The fluid turbines may be used to extract energy from fluids such as air (i.e. wind) or water. The aerodynamic principles of a mixer ejector wind turbine also apply to hydrodynamic principles of a mixer ejector water turbine.

In this regard, wind turbines usually contain a propeller-like device, termed the "impeller", which is faced into a moving air stream. As the air hits the impeller, the air produces a force on the impeller in such a manner as to cause the impeller to rotate about its center. The impeller is directly connected to an electricity generator or indirectly connected through linkages such as gears, belts, chains or other means. Such turbines are used for generating electricity and powering batteries. Conventional horizontal axis wind turbines (HAWTs) used for power generation have two to five open blades arranged like a propeller, the blades being mounted to a horizontal shaft attached to a gear box which drives a power generator. HAWTs will not exceed the Betz limit of 59.3% efficiency in capturing the potential energy of the wind passing through it. HAWTs are also heavy, requiring substantial support and increasing transport costs of the components. It would be desirable to increase the efficiency of a fluid turbine by collecting additional energy from the fluid.

BRIEF DESCRIPTION

The present disclosure relates to shrouded fluid turbines having a turbine shroud and an ejector shroud. An impeller surrounds the turbine shroud. The ejector shroud surrounds the impeller. At least one of the turbine shroud or the ejector shroud has a plurality of mixing lobes on its trailing edge. The mixing lobes cause low-energy fluid which has passed through the impeller to be mixed with high-energy fluid that has bypassed the impeller. This allows fluid to keep flowing through the fluid turbine, reducing the occurrence of diffuser stall.

Disclosed in various embodiments is a shrouded axial flow fluid turbine comprising: a turbine shroud having a leading edge and a trailing edge, the turbine shroud forming an open passageway; an ejector shroud having a leading edge and a trailing edge; and means for extracting energy from a high-energy fluid stream. The means for extracting energy is disposed in an annulus formed between the turbine shroud and the ejector shroud. A first plurality of mixing lobes is located along the trailing edge of either the turbine shroud or the ejector shroud such that the trailing edge has a circular crenellated shape.

In some embodiments, the leading edge of the turbine shroud is substantially coplanar with the leading edge of the ejector shroud.

Sometimes the turbine shroud has a radius; the annulus has a height measured from the turbine shroud to the ejector shroud; and the turbine shroud radius is equal to or greater than the annular height.

The trailing edge of the turbine shroud may be downstream of the trailing edge of the ejector shroud. Alternatively, the trailing edge of the ejector shroud can be downstream of the trailing edge of the turbine shroud.

In some embodiments, the first plurality of mixing lobes is located along the trailing edge of the turbine shroud. The ejector shroud can have a ring airfoil shape, with the low pressure side being on the interior of the ejector shroud. Alternatively, the ejector shroud further comprises a second plurality of mixing lobes such that the trailing edge of the ejector shroud has a circular crenellated shape.

In other embodiments, the first plurality of mixing lobes is located along the trailing edge of the ejector shroud. The turbine shroud can have a ring airfoil shape, with the low pressure side being on the interior of the turbine shroud.

In some embodiments, the means for extracting energy comprises (i) stator vanes extending between the turbine shroud and the ejector shroud; and (ii) a rotor downstream of the stator vanes. The rotor may comprise a ring having a plurality of permanent magnets arranged to form a Halbach cylinder that produces a magnetic field; and wherein the means for extracting energy further comprises at least one phase winding. The permanent magnets can comprise $Nd_2Fe_{14}B$, $SmCo_5$, or $SmCo_7$.

In different embodiments, the ejector shroud is a discontinuous airfoil comprising a continuous forward ring and a plurality of shroud segments. The shroud segments are placed circumferentially around the forward ring with spaces between adjacent shroud segments, and the shroud segments defining the trailing edge of the ejector shroud.

The mixing lobes may have full sidewalls, or the mixing lobes may have sidewalls with cutouts.

Also disclosed in other embodiments is a shrouded axial flow fluid turbine comprising: a turbine shroud having a leading edge and a trailing edge, the turbine shroud forming an open passageway; an impeller surrounding the turbine shroud; and an ejector shroud having a leading edge and a trailing edge, the ejector shroud surrounding the impeller. The leading edge of the turbine shroud is substantially coplanar with the leading edge of the ejector shroud. A plurality of mixing lobes is located along the trailing edge of either the turbine shroud or the ejector shroud such that the trailing edge has a circular crenellated shape.

In some embodiments, the turbine shroud has a radius; the impeller has a height; and the turbine shroud radius is equal to or greater than the impeller height.

The impeller may be a permanent ring generator.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

Figure 1:
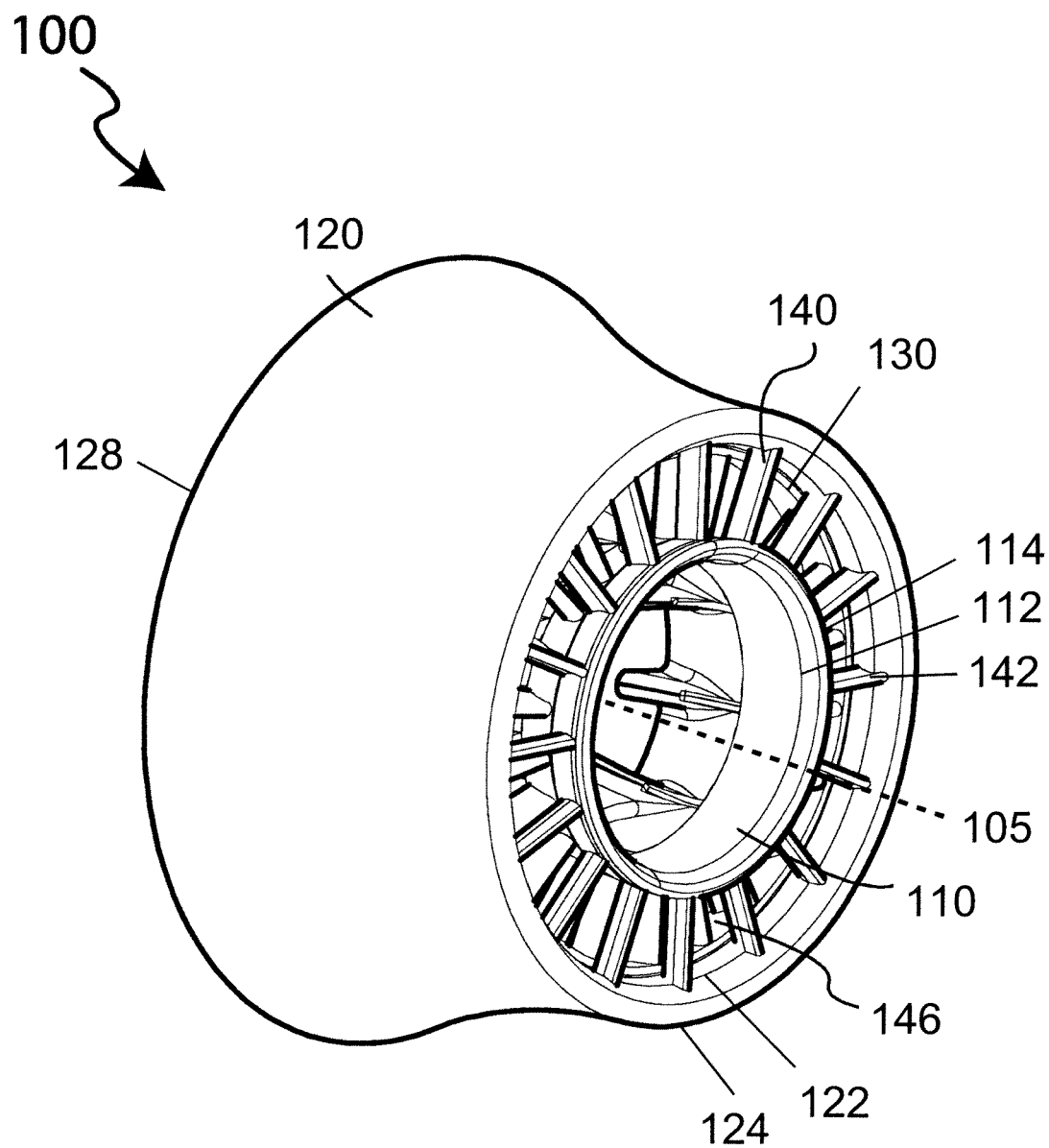
FIG. 1 is an exterior perspective view of a first exemplary embodiment of the shrouded fluid turbine of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

The term "about" when used with a quantity includes the stated value and also has the meaning dictated by the context. For example, it includes at least the degree of error associated with the measurement of the particular quantity. When used in the context of a range, the term "about" should also be considered as disclosing the range defined by the absolute values of the two endpoints. For example, the range "from about 2 to about 4" also discloses the range "from 2 to 4."

The term "impeller" is used herein to refer to any assembly in which blades are attached to a shaft and able to rotate, so that energy can be extracted from a fluid rotating the blades and be converted into mechanical or electrical energy or power. Exemplary impellers include a propeller or a rotor/stator assembly. Many different kinds of engines include impellers in their inner workings as well. Any type of impeller may be enclosed within the turbine shroud in the fluid turbine of the present disclosure.

The leading edge of the turbine shroud may be considered the front of the fluid turbine, and the trailing edge of the ejector shroud may be considered the rear of the fluid turbine. A first component of the fluid turbine located closer to the front of the turbine may be considered "upstream" of a second component located closer to the rear of the turbine. Put another way, the second component is "downstream" of the first component.

The present disclosure relates to a shrouded axial flow fluid turbine comprising a turbine shroud, an ejector shroud, and a means for extracting energy from a high-energy fluid stream. An open passageway is present in the turbine shroud through which a primary high-energy fluid stream can pass. The turbine shroud is located substantially within the ejector shroud. The means for extracting energy is located in the annular area between the turbine shroud and the ejector shroud. As discussed further herein, the means for extracting energy may be a ring generator system. A secondary high-energy fluid stream passes through the means for extracting energy, which captures energy from the secondary fluid stream so that a low-energy fluid stream exits the means for extracting energy. One or both of the turbine shroud and the ejector shroud have mixing lobes on their trailing edge.

Figure 2:
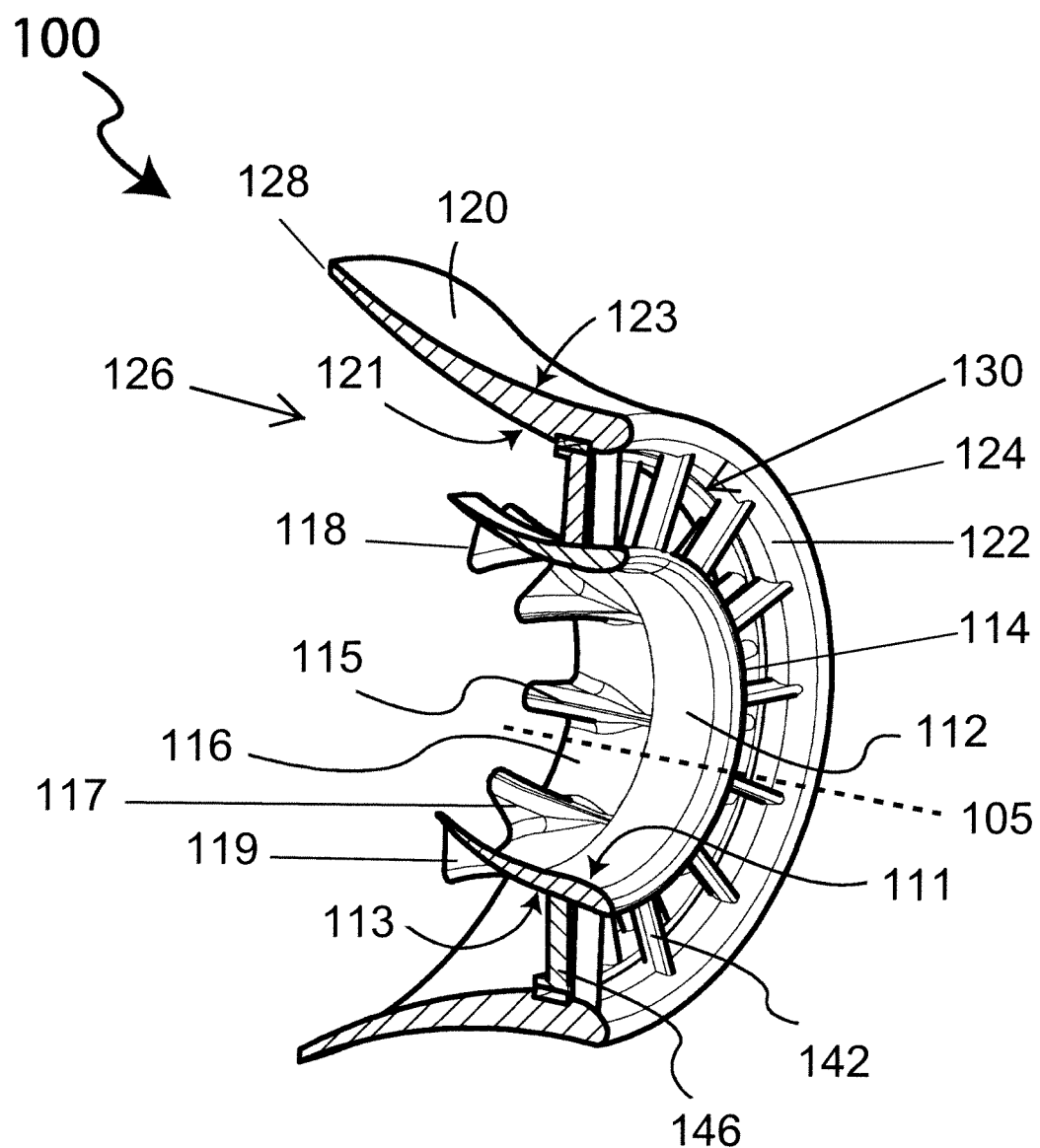
FIG. 2 is a cross-sectional perspective view of the fluid turbine of FIG. 1.
Figure 3:
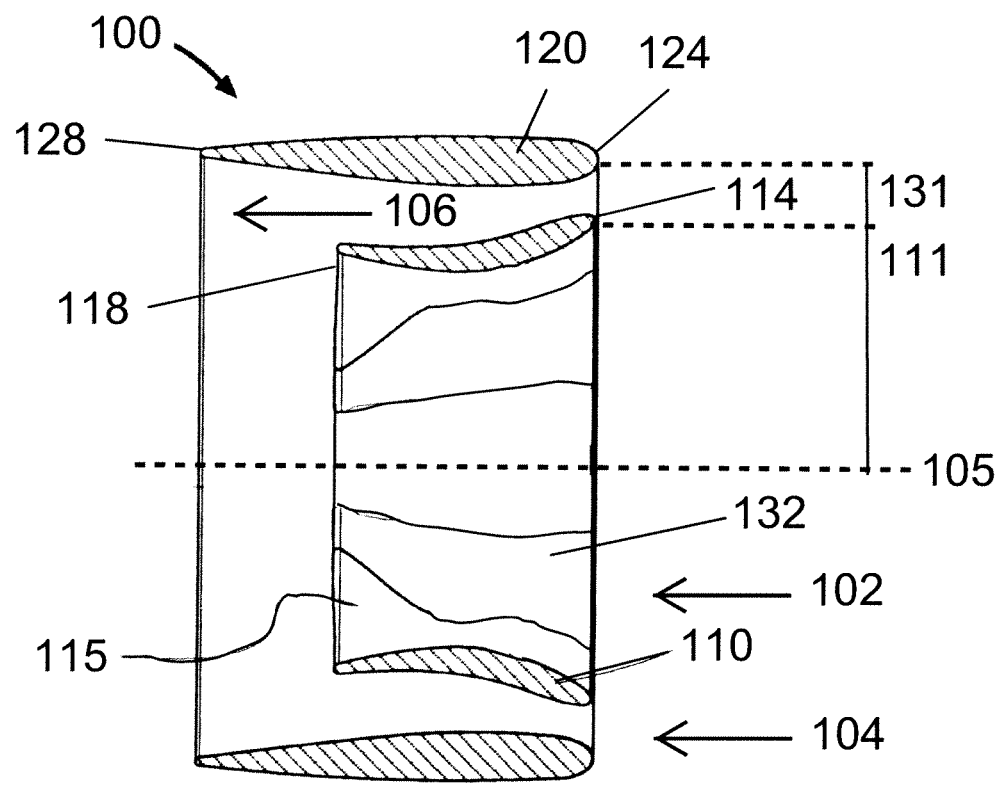
FIG. 3 is a side cross-sectional view of the shrouds of the fluid turbine of FIG. 1.
Figure 4:
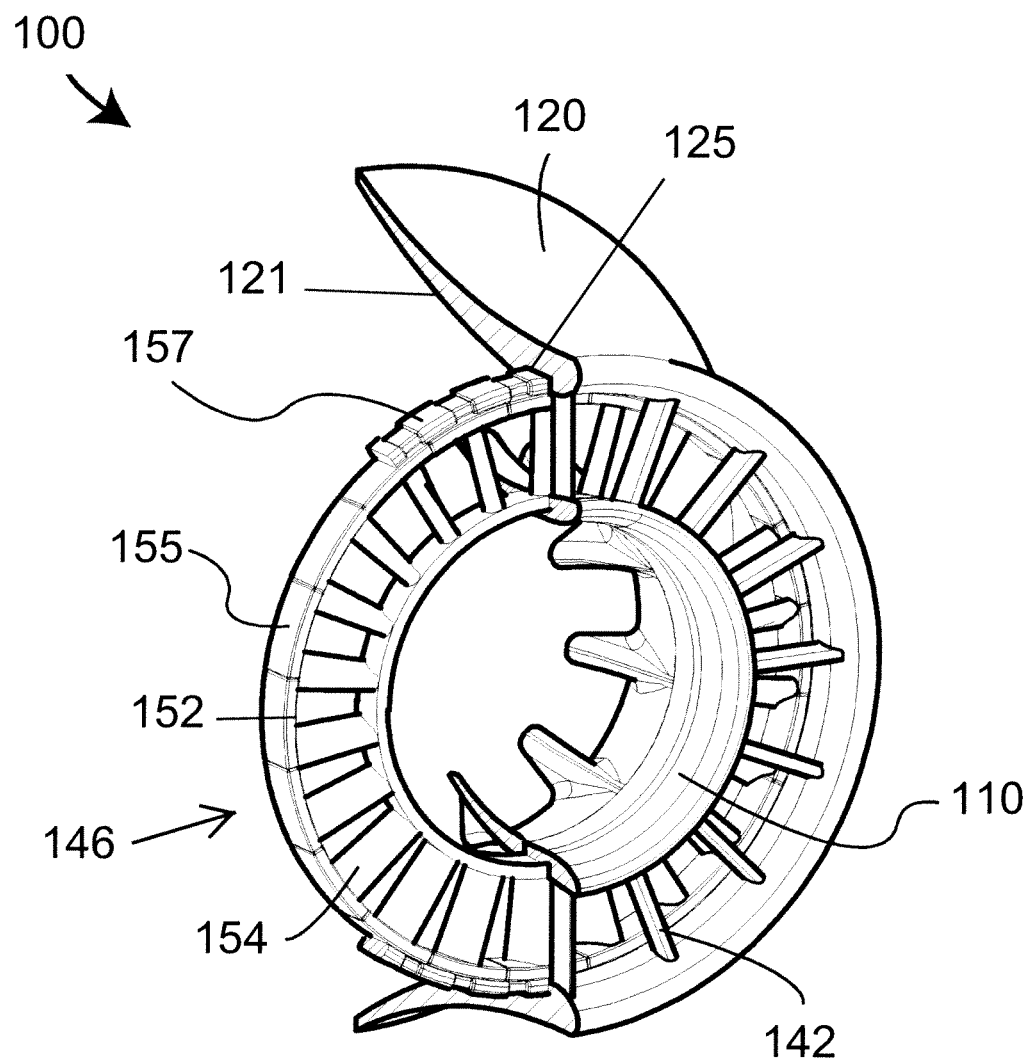
FIG. 4 is a partial cross-sectional perspective view showing the ring generator system in the fluid turbine of FIG. 1

FIGS. 1-4 are different perspective views of a first exemplary embodiment of the shrouded fluid turbine of the present disclosure. FIG. 1 is an exterior perspective view. FIG. 2 is a cross-sectional perspective view. FIG. 3 is a side cross-sectional view of the shrouds used in the shrouded fluid turbine. FIG. 4 is a partial cross-sectional perspective view showing the ring generator system.

Referring to FIG. 1 and FIG. 2, the shrouded fluid turbine 100 comprises a turbine shroud 110, a means for extracting energy 140, and an ejector shroud 120. The turbine shroud 110 includes a front end 112, also known as an inlet end or a forward ring. The front end includes a leading edge 114 of the turbine shroud. The turbine shroud 110 also includes a rear end 116, also known as an exhaust end. The rear end includes a trailing edge 118 of the turbine shroud. The ejector shroud 120 also includes a front end or inlet end 122, and a rear end or exhaust end 126. Again, the front end includes a leading edge 124 of the ejector shroud. The rear end includes a trailing edge 128 of the ejector shroud. The front ends 112, 122 of the two shrouds can be described as "flared" because each shroud has a larger cross-sectional area, in a plane perpendicular to the central axis 105, at the inlet than at the means for extracting energy 140. The leading edges 114, 124 of both the turbine shroud and the ejector shroud are circular.

As best seen in FIG. 2, the turbine shroud 110 has the cross-sectional shape of an airfoil with the suction side (i.e. low pressure side) on the interior of the turbine shroud. The turbine shroud 110 has an inner surface 111 and an outer surface 113. The ejector shroud 120 has an inner surface 121 and an outer surface 123. In this embodiment, the rear end 116 of the turbine shroud also has mixing lobes 115. The mixing lobes extend downstream beyond the rotor blades. Put another way, the trailing edge 118 of the turbine shroud is defined by a plurality of mixing lobes. The rear or downstream end of the turbine shroud 110 is shaped to form two different sets of mixing lobes. Inward mixing lobes 117 extend inwardly towards the central axis 105. Outward mixing lobes 119 extend outwardly away from the central axis 105. The resulting trailing edge 118 has a circular crenellated shape, as discussed further herein (see FIG. 12). The ejector shroud 120 also has the cross-sectional shape of an airfoil with the suction side (i.e. low pressure side) on the interior of the ejector shroud. In this embodiment, the ejector shroud has a ring airfoil shape and does not have mixing lobes.

The means for extracting energy 140 is located in the annulus or annular area 130 formed between the turbine shroud 110 and the ejector shroud 120. Put another way, the means for extracting energy 140 surrounds the turbine shroud 110. The means for extracting energy extracts energy from the flow of a fluid and converts that energy into mechanical or electrical energy or power. Exemplary means include impellers such as a propeller or rotor/stator assembly, and various engines such as a gas turbine engine or a water turbine engine. Such engines may also be considered impellers.

In FIG. 1, the means for extracting energy 140 is a rotor/stator assembly. Stator vanes 142 extend between the turbine shroud 110 and the ejector shroud 120. Downstream of the stator vanes 142 is a propeller or rotor 146. The stator vanes 142 guide a fluid stream onto the rotor 146, forming a cascade. The stator vanes also experience the major loading of the fluid, allowing for more robust and stronger blade design on the rotor 146. The means for extracting energy 140, turbine shroud 110, and ejector shroud 120 are coaxial with each other, i.e. they share a common central axis 105.

Referring now to FIG. 3, when viewed from the side, the leading edge 114 of the turbine shroud is substantially coplanar with the leading edge 124 of the ejector shroud. Put another way, the ejector shroud 120 completely surrounds the turbine shroud 110. It should be noted that the turbine shroud 110 surrounds an open passageway 132 through the turbine. As shown in this embodiment, the trailing edge 128 of the ejector shroud is downstream of the trailing edge 118 of the turbine shroud. This may vary, as seen in other following embodiments. The trailing edge 118 of the turbine shroud is downstream of the impeller 140.

Also seen here is a radius 111 of the turbine shroud, measured from the central axis 105. The annular height 131 is measured from the turbine shroud 110 to the ejector shroud 120 normal to the central axis 105 in a radial direction along the leading edge 114, 124. In embodiments, the turbine shroud radius 111 is equal to or greater than the annular height 131. Put another way, the impeller has a height 131 that is equal to or less than the turbine shroud radius 111.

FIG. 4 shows a permanent ring generator being used with the shrouded fluid turbine of the present disclosure. Briefly, the rotor 146 contains a central ring 150 and an outer ring 152. Rotor blades 154 extend between the central ring 150 and the outer ring 152, connecting them together. The turbine shroud 110 extends through the central ring 150 to support the rotor 146 and fix its location relative to the turbine shroud 110 and ejector shroud 120. Permanent magnets 155 are mounted on the rotor 146, here on the outer ring 152. One or more phase windings 157 are mounted on the turbine 100 in the ejector shroud 120. As the rotor rotates, a constant rotating magnetic field is produced by the magnets 155. This magnetic field induces an alternating current (AC) voltage in the phase windings to produce electrical energy which can be captured. The ejector shroud 120 may include a groove 125 on an inner surface 121 through which the rotor 146 travels.

Generally, the fluid turbine operates by extracting energy from fluid flowing through the turbine. Referring back to FIG. 3, a primary high-energy fluid stream 102 passes through the interior of the turbine shroud, bypassing the impeller (not shown in FIG. 3). A secondary high-energy fluid stream 104 passes through the impeller, which extracts energy from the secondary fluid stream to produce a low-energy impeller exit flow stream 106. The inward mixing lobes 119 direct the low-energy flow stream 106 inwards towards the primary high-energy fluid stream 102 passing through the turbine shroud. The outward mixing lobes 117 direct the primary high-energy fluid stream 102 outwards toward the low-energy flow stream 106. This causes the high-energy stream 102 and low-energy stream 106 to mix, generating axial vorticity which in turn increases the volume of fluid flowing through the turbine. Thus, the inward mixing lobes 119 of the turbine shroud could be considered low-energy mixing lobes, and the outward mixing lobes 117 of the turbine shroud could be considered high-energy mixing lobes, based on the energy in the fluid streams they direct.

Figure 5:
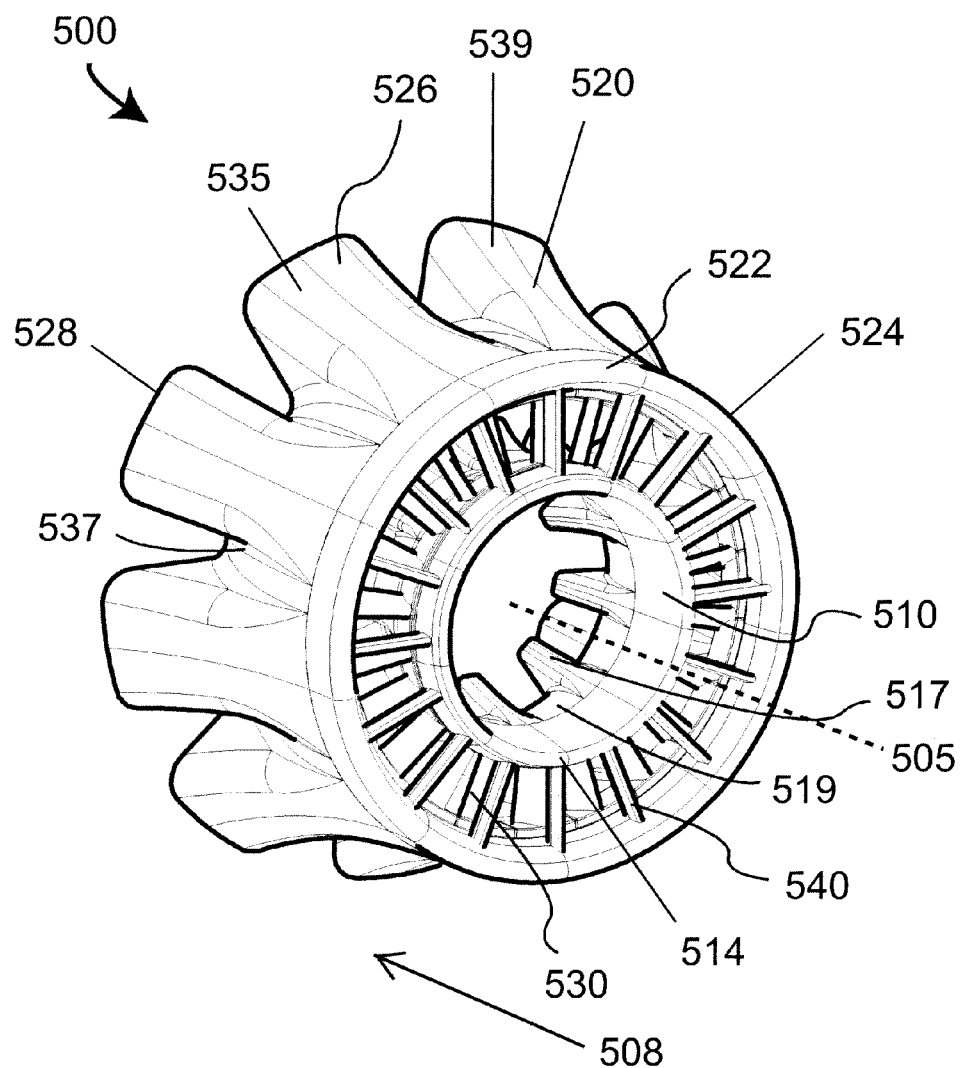
FIG. 5 is an exterior perspective view of a second exemplary embodiment of the shrouded fluid turbine of the present disclosure.
Figure 6:
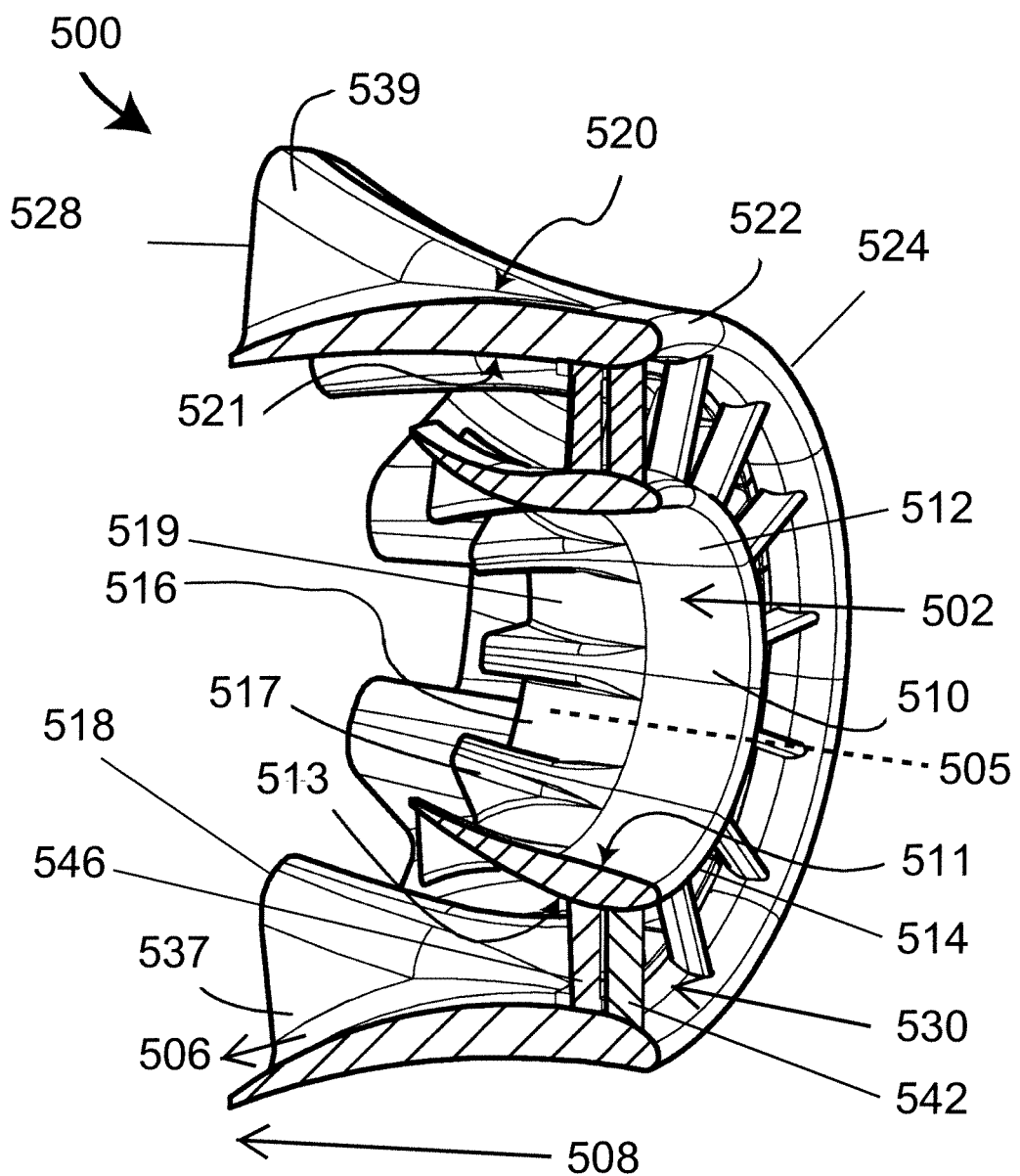
FIG. 6 is a cross-sectional perspective view of the fluid turbine of FIG. 5.

FIG. 5 and FIG. 6 are different perspective views of a second exemplary embodiment of the shrouded fluid turbine of the present disclosure. FIG. 5 is an exterior perspective view. FIG. 6 is a cross-sectional perspective view.

This second exemplary embodiment is similar to the first exemplary embodiment in many respects. The shrouded fluid turbine 500 comprises a turbine shroud 510, an impeller 540, and an ejector shroud 520. The turbine shroud 510 includes a front end or inlet end 512. The front end includes a leading edge 514 of the turbine shroud. The turbine shroud 510 also includes a rear end or exhaust end 516. The rear end includes a trailing edge 518 of the turbine shroud. An inner surface 511 of the turbine shroud forms an open passageway through which a high-energy fluid stream can bypass the impeller. The ejector shroud 520 also includes a front end or inlet end 522, and a rear end or exhaust end 526. Again, the front end includes a leading edge 524 of the ejector shroud. The rear end includes a trailing edge 528 of the ejector shroud. The leading edges 514, 524 of both the turbine shroud and the ejector shroud are circular. The impeller 540 is located in the annulus or annular area 530 formed between the turbine shroud 510 and the ejector shroud 520. The outer surface 513 of the turbine shroud is adjacent the impeller, as is the inner surface 521 of the ejector shroud. The impeller 540 is again a rotor/stator assembly, with stator vanes 542 extending between the turbine shroud 510 and the ejector shroud 520, and a rotor 546 downstream of the stator vanes 542. The impeller 540, turbine shroud 510, and ejector shroud 520 are coaxial with each other. The leading edge 514 of the turbine shroud is substantially coplanar with the leading edge 524 of the ejector shroud. The turbine shroud radius is again equal to or greater than the annular height. Again in this embodiment, the trailing edge 528 of the ejector shroud is downstream of the trailing edge 518 of the turbine shroud.

Like the turbine shroud 110 of FIGS. 1-4, the rear end 516 of the turbine shroud of FIG. 5 has mixing lobes. The trailing edge 518 of the turbine shroud is defined by a plurality of mixing lobes. Inward mixing lobes 517 extend inwardly towards the central axis 505. Outward mixing lobes 519 extend outwardly away from the central axis 505.

Unlike the first exemplary embodiment, however, the ejector shroud 520 of this second exemplary embodiment also has mixing lobes 535. The trailing edge 528 of the ejector shroud can be defined by a plurality of mixing lobes. Inward mixing lobes 537 extend inwardly towards the central axis 505. Outward mixing lobes 539 extend outwardly away from the central axis 505. In addition, the forward ring 112 of the first embodiment is formed as a single integral piece (see FIG. 1). In contrast, the turbine shroud of FIG. 5 is made using several lobe segments, as will be explained further herein.

With respect to the ejector shroud 520, a tertiary high-energy fluid stream 508 runs along the exterior of the ejector shroud 510 and does not enter either the turbine shroud 520 or the impeller 540. The outward mixing lobes 539 of the ejector shroud direct the low-energy flow stream 506 outwards towards the tertiary high-energy fluid stream 508 passing outside the ejector shroud. The inward mixing lobes 537 direct the tertiary high-energy fluid stream 508 inwards toward the low-energy flow stream 506. As a result, the low-energy stream 506 mixes with both the primary high-energy fluid stream 502 passing through the turbine shroud and the tertiary high-energy fluid stream 508, generating axial vorticity which in turn increases the volume of fluid flowing through the turbine. Thus, the inward mixing lobes 537 of the ejector shroud could be considered high-energy mixing lobes, and the outward mixing lobes 539 of the ejector shroud could be considered low-energy mixing lobes, again based on the energy in the fluid streams they direct.

Figure 7:
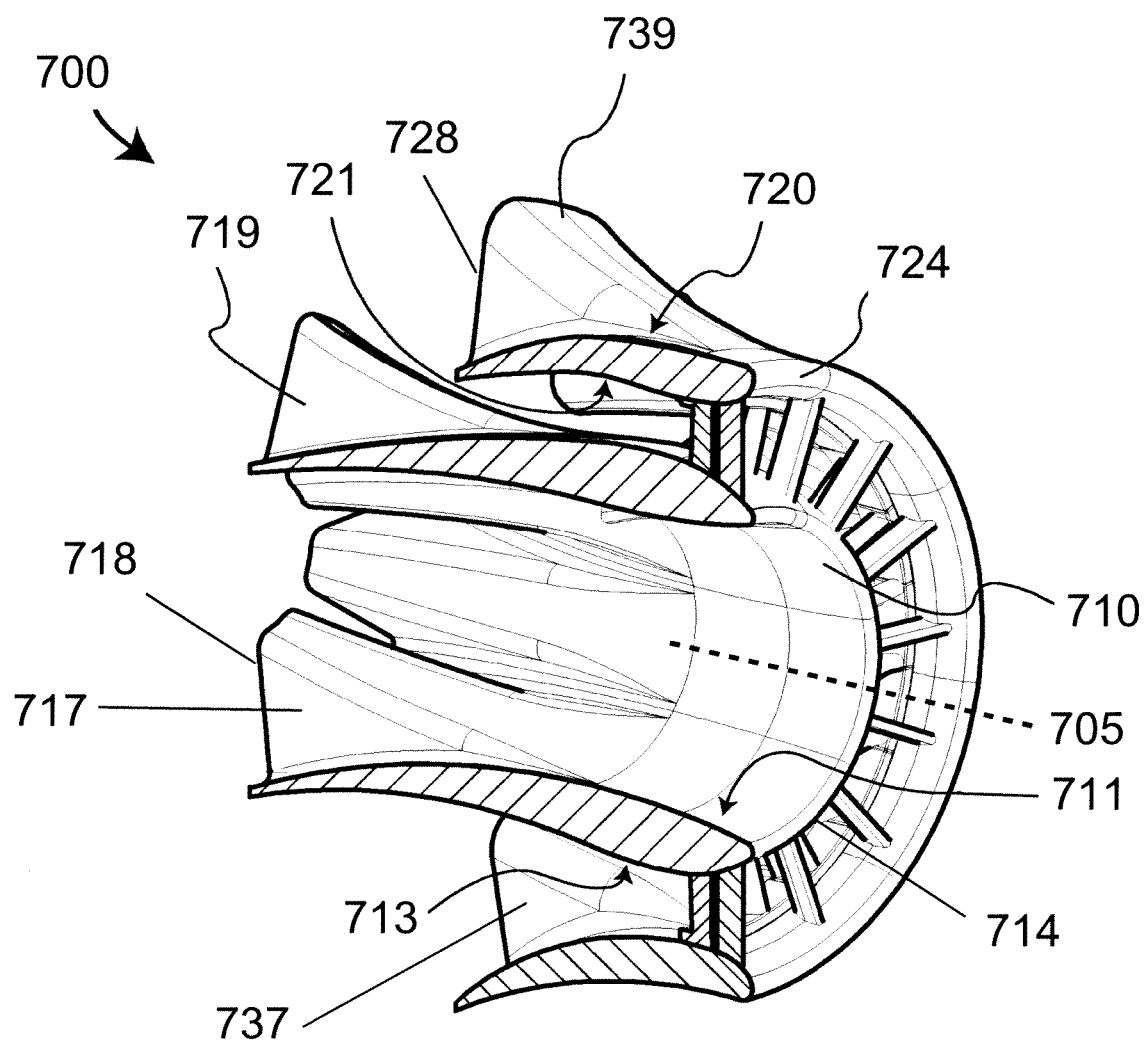
FIG. 7 is a cross-sectional perspective view of a third exemplary embodiment of the shrouded fluid turbine of the present disclosure.

FIG. 7 is a cross-sectional perspective view of a third exemplary embodiment of a shrouded fluid turbine 700 of the present disclosure. This third embodiment contains all of the components previously described in the description of FIGS. 1-6. Notably, the turbine shroud 710 has an inner surface 711, an outer surface 713, a leading edge 714, and a trailing edge 718. The trailing edge 718 of the turbine shroud includes a plurality of mixing lobes. Inward mixing lobes 717 extend inwardly towards the central axis 705. Outward mixing lobes 719 extend outwardly away from the central axis 705. The ejector shroud 720 has an inner surface 721, a leading edge 724 and a trailing edge 728. The trailing edge 728 of the ejector shroud also includes a plurality of mixing lobes. Inward mixing lobes 737 extend inwardly towards the central axis 705. Outward mixing lobes 739 extend outwardly away from the central axis 705. The leading edge 714 of the turbine shroud is substantially coplanar with the leading edge 724 of the ejector shroud. The turbine shroud radius is again equal to or greater than the annular height. However, in this third embodiment, the trailing edge 718 of the turbine shroud is downstream of the trailing edge 728 of the ejector shroud. Put another way, the turbine shroud is longer in an axial direction than the ejector shroud. In other words, the axial length of the turbine shroud 710 is greater than the axial length of the ejector shroud 720.

Figure 8:
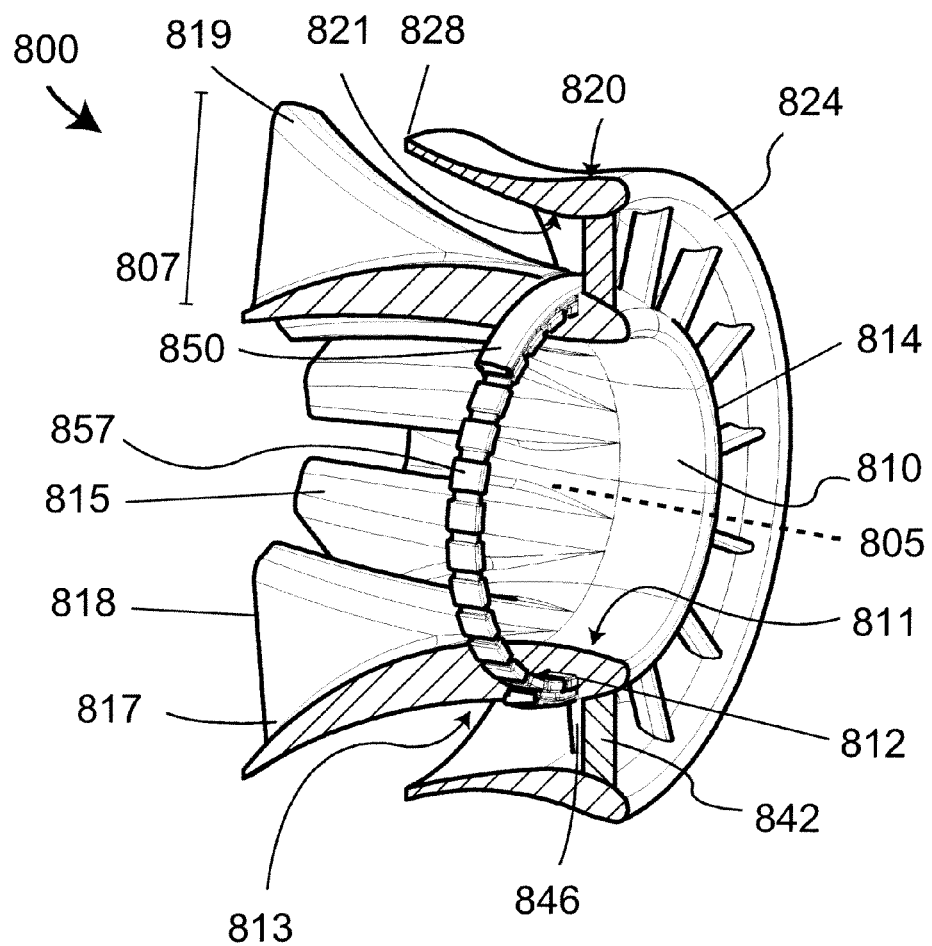
FIG. 8 is a cross-sectional perspective view of a fourth exemplary embodiment of the shrouded fluid turbine of the present disclosure.

FIG. 8 is a partial cross-sectional perspective view of a fourth exemplary embodiment of a shrouded fluid turbine 800 of the present disclosure. This fourth embodiment contains all of the components previously described in the description of FIGS. 1-6. Again, the turbine shroud 810 has an inner surface 811, an outer surface 813, a leading edge 814, and a trailing edge 818. The trailing edge 818 of the turbine shroud includes a plurality of mixing lobes. Inward mixing lobes 817 extend inwardly towards the central axis 805. Outward mixing lobes 819 extend outwardly away from the central axis 805. The ejector shroud 820 has an inner surface 821, a leading edge 824 and a trailing edge 828. This ejector shroud 820 has a ring airfoil shape, or in other words no mixing lobes are present. The leading edge 814 of the turbine shroud is substantially coplanar with the leading edge 824 of the ejector shroud. The turbine shroud radius is again equal to or greater than the annular height. The trailing edge 818 of the turbine shroud is downstream of the trailing edge 828 of the ejector shroud. Put another way, the axial length of the turbine shroud 810 is greater than the axial length of the ejector shroud 820.

There are two differences in the embodiment of FIG. 8. First, the height 807 of the turbine shroud mixing lobes 815 is much larger. This height is measured in the radial direction and will be addressed further herein. Second, the permanent ring generator here is based in the turbine shroud 810. Stator vanes 842 are present. The rotor 846 again includes rotor blades (not shown) connecting a central ring 850 and an outer ring (not shown). The permanent magnets (not shown) are mounted on the central ring 850. The phase winding 857 are mounted in the turbine shroud 810. The turbine shroud 810 includes a groove 812 on an outer surface 813 through which the rotor travels.

Figure 9:
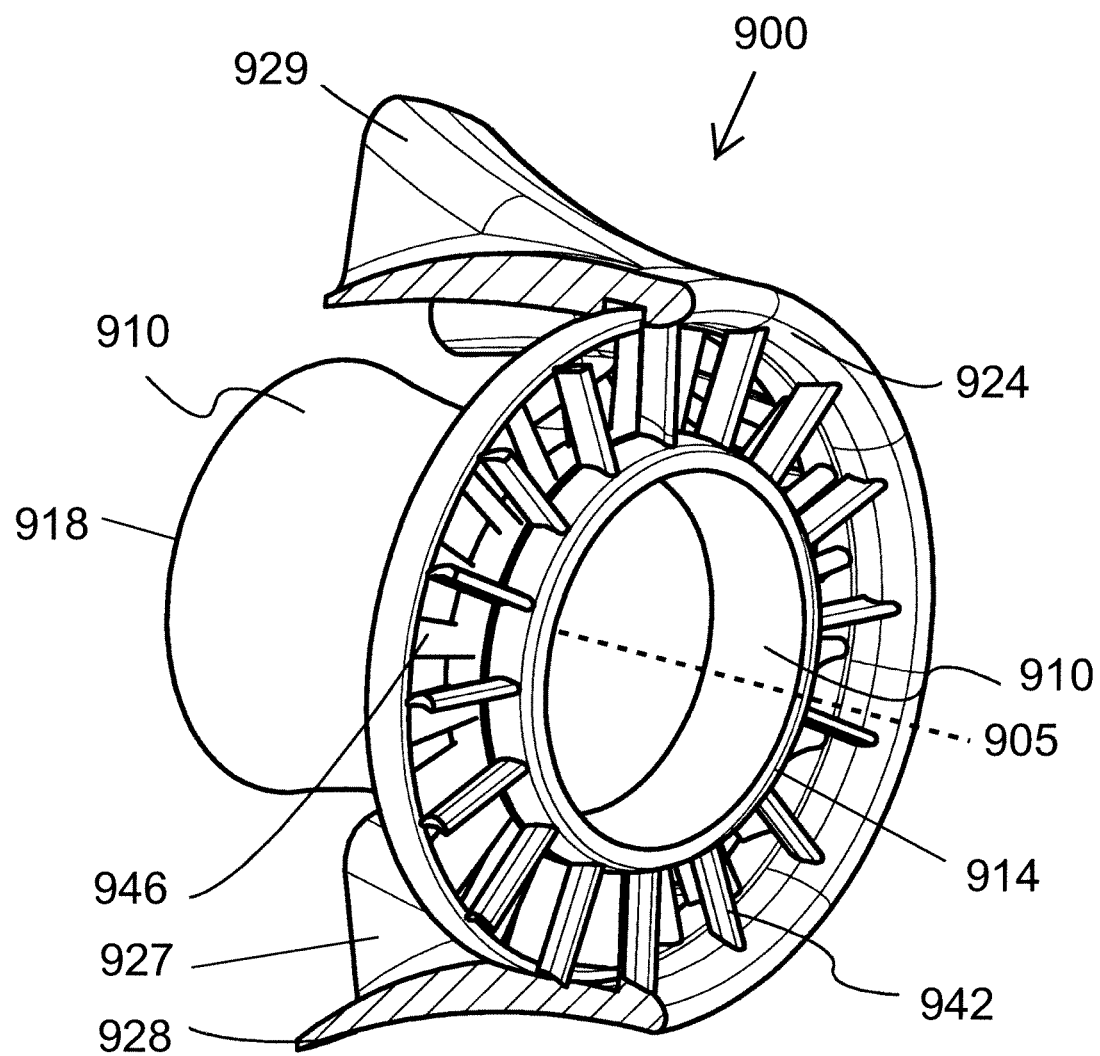
FIG. 9 is a cross-sectional perspective view of a fifth exemplary embodiment of the shrouded fluid turbine of the present disclosure.

FIG. 9 is a partial cross-sectional perspective view of a fifth exemplary embodiment of a shrouded fluid turbine 900 of the present disclosure. This fifth embodiment contains all of the components previously described in the description of FIGS. 1-6. Again, the turbine shroud 910 has a leading edge 914 and a trailing edge 918. However, in this embodiment, the turbine shroud 910 has a ring airfoil shape, or in other words no mixing lobes are present. The ejector shroud 920 has a leading edge 924 and a trailing edge 928. However, the trailing edge 928 of the ejector shroud includes a plurality of mixing lobes 925. Inward mixing lobes 927 extend inwardly towards the central axis 905. Outward mixing lobes 929 extend outwardly away from the central axis 905. The leading edge 914 of the turbine shroud is substantially coplanar with the leading edge 924 of the ejector shroud. The turbine shroud radius is again equal to or greater than the annular height. The trailing edge 918 of the turbine shroud is downstream of the trailing edge 928 of the ejector shroud. The stator vanes 942 and the rotor 946 are also shown.

To summarize, the present disclosure contemplates three arrangements of mixing lobes: (1) mixing lobes only on the turbine shroud and a ring airfoil shape for the ejector shroud; (2) mixing lobes only on the ejector shroud and a ring airfoil shape for the turbine shroud; and (3) mixing lobes on both the turbine shroud and the ejector shroud. The present disclosure also contemplates that either the turbine shroud or the ejector shroud may have the greater axial length.

Figure 10:
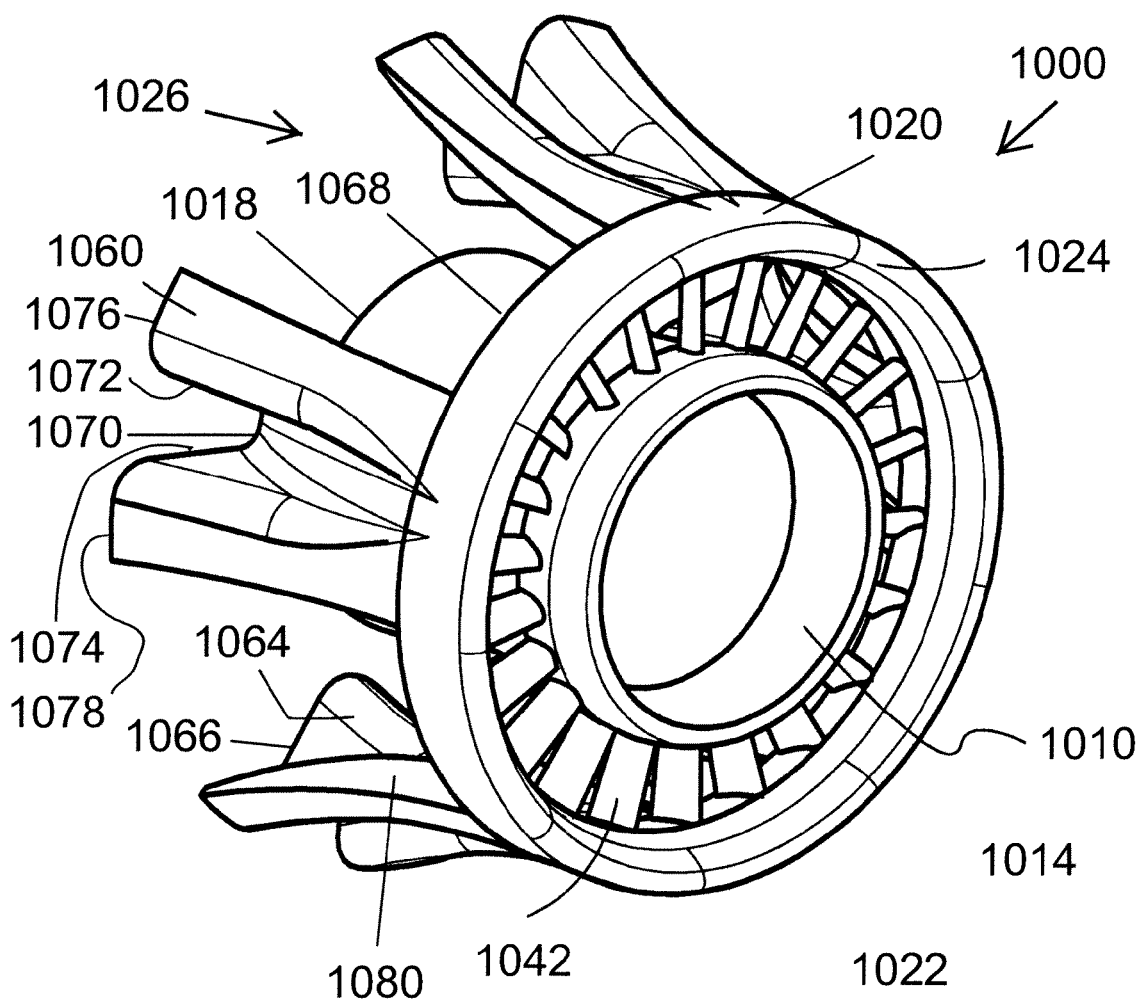
FIG. 10 is a perspective view of a sixth exemplary embodiment of a shrouded fluid turbine of the present disclosure.

FIG. 10 is a perspective view of a sixth exemplary embodiment of a shrouded fluid turbine 1000 of the present disclosure. The description of FIGS. 1-6 applies to several of the components in this embodiment. Again, the turbine shroud 1010 has a leading edge 1014 and a trailing edge 1018. The turbine shroud 1010 has a ring airfoil shape, or in other words no mixing lobes are present. The ejector shroud 1020 has a leading edge 1024 and a trailing edge 1028. The leading edge 1014 of the turbine shroud is substantially coplanar with the leading edge 1024 of the ejector shroud. The turbine shroud radius is again equal to or greater than the annular height. The stator vanes 1042 are also visible.

The forward end or inlet end 1022 of the ejector shroud 1020 is formed as a continuous forward ring which is connected to the turbine shroud 1010 through the stator vanes 1042. The forward ring contains the leading edge 1024. Connected to the rear of the forward ring is a plurality of shroud segments 1060. Three shroud segments are visible, although the number of segments may be varied and is not limited to three. Each shroud segment 1060 has a streamlined airfoil shape in cross-section (reference numeral 1080). A first mixing lobe 1064 is formed on a trailing edge 1066 of the shroud segment 1060. The shroud segments 1060 are connected to the forward ring 1022 to form the outlet end 1026 of the overall ejector shroud 1020. Put another way, the shroud segments 1060 define the trailing edge of the overall ejector shroud 1020. The shroud segments 1060 are placed circumferentially around the forward ring, with spaces 1068 between adjacent shroud segments. As a result, the shroud segments form what may be considered an annular, cylindrical, or discontinuous airfoil. The segments may be spaced evenly about the circumference, when viewed along the central axis of the turbine. The shroud segments are oriented to produce low pressure on an interior side of the ejector shroud.

The first mixing lobe 1064 is formed from a central circumferential surface 1070 and two side surfaces 1072, 1074. The two side surfaces 1072, 1074 are located on either side of the central circumferential surface and are substantially perpendicular to the central circumferential surface 1070, when viewed along the central axis of the turbine (i.e. the side surfaces extend radially). In addition, each first mixing lobe 1064 includes two edge circumferential surfaces 1076, 1078. These edge circumferential surfaces have a different radius of curvature compared to the central circumferential surface, as will be explained further herein. Lateral side surfaces 1080 are also visible.

Comparing FIG. 10 with FIG. 2, the longitudinal spaces between shroud segments of the present disclosure can be considered as defining second mixing lobes indicated at 1072. In this embodiment, the first mixing lobes 1064 are analogous to the inward mixing lobes 117 of FIG. 2, while the second mixing lobes 1072 are analogous to the outward mixing lobes 119 of FIG. 1.

Figure 11:
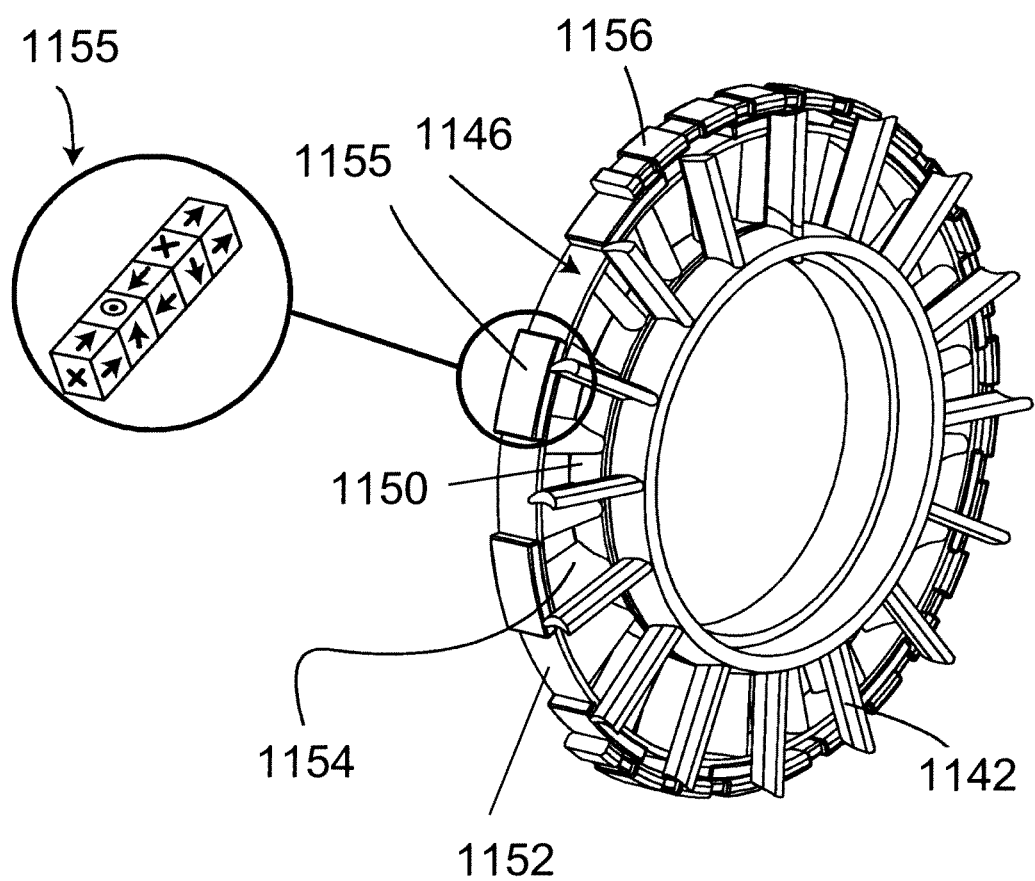
FIG. 11 is a perspective view of a permanent ring generator that can be used with the shrouded fluid turbine of the present disclosure.

FIG. 11 is a perspective view of a permanent ring generator that can be used with the shrouded fluid turbine of the present disclosure. Stator vanes 1142 are located upstream of the rotor 1146. The rotor itself contains a central ring 1150 and an outer ring 1152. Rotor blades 1154 extend between the central ring 1150 and the outer ring 1152, connecting them together. A plurality of permanent magnets 1155 is located on one of the rings, here the outer ring 1152. The magnets are generally evenly distributed around the circumference of the rotor. It should be noted that in the field of electric motors, the word "stator" is used to refer to the stationary portion of a rotor/stator system. The phrase "static ring" is used here to reduce any confusion between the stationary portion 1156 of the power generation system (i.e. the phase windings) and the stationary vanes 1142 that direct fluid against the rotor 1146.

FIG. 11 contains an enlarged view of some permanent magnets 1155. On each magnet is an arrow showing the orientation of the magnetic field. The magnets are arranged in a Halbach array, so that the magnetic field exterior or outside of the rotor is enhanced, while the magnetic field interior to or inside of the rotor is decreased to near zero. Of course, this direction can be reversed if the phase windings are located on the interior of the rotor. The magnets can be separated by spaces or potting material. It should be noted that while the overall magnetic field created by the Halbach cylinder is on the exterior (or interior) of the rotor, the magnetic field itself is generated by a combination of flux lines that alternate in direction, resulting in a magnetic field that can induce AC voltage in the phase windings. Electrical current is generated in the phase windings due to the alternating magnetic field. Because the strength of the generated current is proportional to the magnitude of the magnetic field, the arrangement of the magnets into a Halbach array increases the amount of electrical current generated per rotation of the rotor.

Permanent magnets are made from magnetized materials which create their own persistent magnetic field. Exemplary magnetic materials are ferromagnetic and ferromagnetic materials including iron, nickel, cobalt, rare earth metals, and lodestone. Permanent magnets are distinguished from electromagnets which are made up of a wire coil through which an electric current passes to create a magnetic effect.

In some embodiments, the permanent magnets comprise a rare earth metal selected from the group consisting of lanthanum, cerium, praseodymium, neodymium, promethium, samarium, europium, gadolinium, terbium, dysprosium, holmium, erbium, thulium, ytterbium, and lutetium. The rare earth metal magnets may comprise neodymium-iron-boron material such as $Nd_2Fe_{14}B$ or a samarium-cobalt material such as $SmCo_5$ or $SmCo_7$. Rare earth magnets produce very high magnetic fields.

Figure 12:
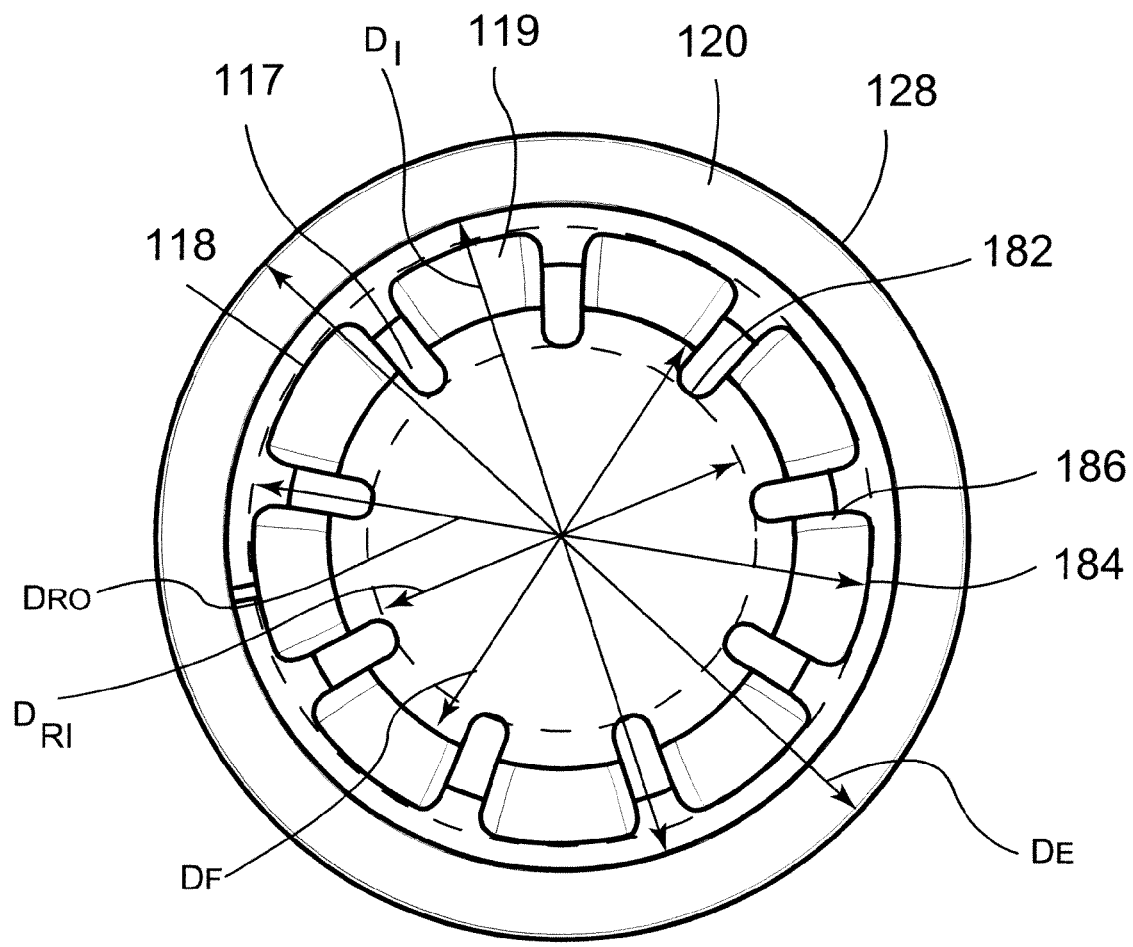
FIG. 12 is a rear view of the shrouded fluid turbine of FIG. 1, with the impeller removed.

FIG. 12 is a rear view of the shrouded fluid turbine of FIG. 1, with the impeller removed for purposes of clarity. The structure of the mixing lobes 115 can be more easily explained with reference to this figure. The turbine shroud 110 has a throat diameter $D_F$. This throat diameter $D_F$ is measured as the smallest diameter of the turbine shroud, and is generally located near the impeller 140. The rear end 116 of the turbine shroud has an inner diameter $D_{RI}$ and an outer diameter $D_{RO}$. The inner diameter $D_{RI}$ is measured as the diameter of a circle formed by the trailing edges of the inward mixing lobes 117. Similarly, the outer diameter $D_{RO}$ is measured as the diameter of a circle formed by the trailing edges of the outward mixing lobes 119. It should be recognized that generally $D_F > D_{RI}$, $D_{RO} > D_{RI}$, and $D_{RO} > D_F$. The ratio of $D_{RI}$ to $D_{RO}$ may be from 0.3 to 0.8.

The ejector shroud 120 also has a throat diameter $D_I$. This throat diameter $D_I$ is measured as the smallest diameter of the ejector shroud, and is generally located near the inlet end 122 of the ejector shroud. The ejector shroud 120 also has an outer diameter $D_E$ at the exhaust end 124. This outer diameter is measured as the diameter of a circle formed by the trailing edge 128 of the ejector shroud 120.

The trailing edge 118 of the turbine shroud 110 has a circular crenellated shape. The trailing edge can be described as including several inner circumferentially spaced arcuate portions 182 which each have the same radius of curvature. Those inner arcuate portions 182 are evenly spaced apart from each other. Between portions 182 are several outer arcuate portions 184, which each have the same radius of curvature. The radius of curvature for the inner arcuate portions 182 is different from the radius of curvature for the outer arcuate portions 184, but the inner arcuate portions and outer arcuate portions have the same center (i.e. along the central axis). The inner arcuate portions 182 and the outer arcuate portions 184 are then connected to each other by radially extending portions 186. This results in a circular crenellated shape. The term "crenellated" as used herein does not require the inner arcuate portions, outer arcuate portions, and radially extending portions to be straight lines, but instead refers to the general up-and-down or in-and-out shape of the trailing edge. This crenellated structure forms two sets of mixing lobes, high energy mixing lobes 117 and low energy mixing lobes 119.

Ejector shrouds with mixing lobes can also be described as having a trailing edge with a circular crenellated shape. In that case, the trailing edge 128 of the ejector shroud would also have an inner diameter and an outer diameter. The inner diameter would be measured as the diameter of a circle formed by the trailing edges of the inward mixing lobes. The outer diameter would be measured as the diameter of a circle formed by the trailing edges of the outward mixing lobes. The outer diameter would correspond to the $D_E$ previously discussed.

As seen in FIG. 2 and FIGS. 6-9, the mixing lobes on the previously depicted shrouded fluid turbines have full sidewalls. Referring to FIG. 2 and FIG. 12, a full sidewall means that the radially extending portions 186 are straight, such that the mixing lobes have completely solid surfaces and fluid flowing through the mixing lobes can only flow axially.

Figure 13:
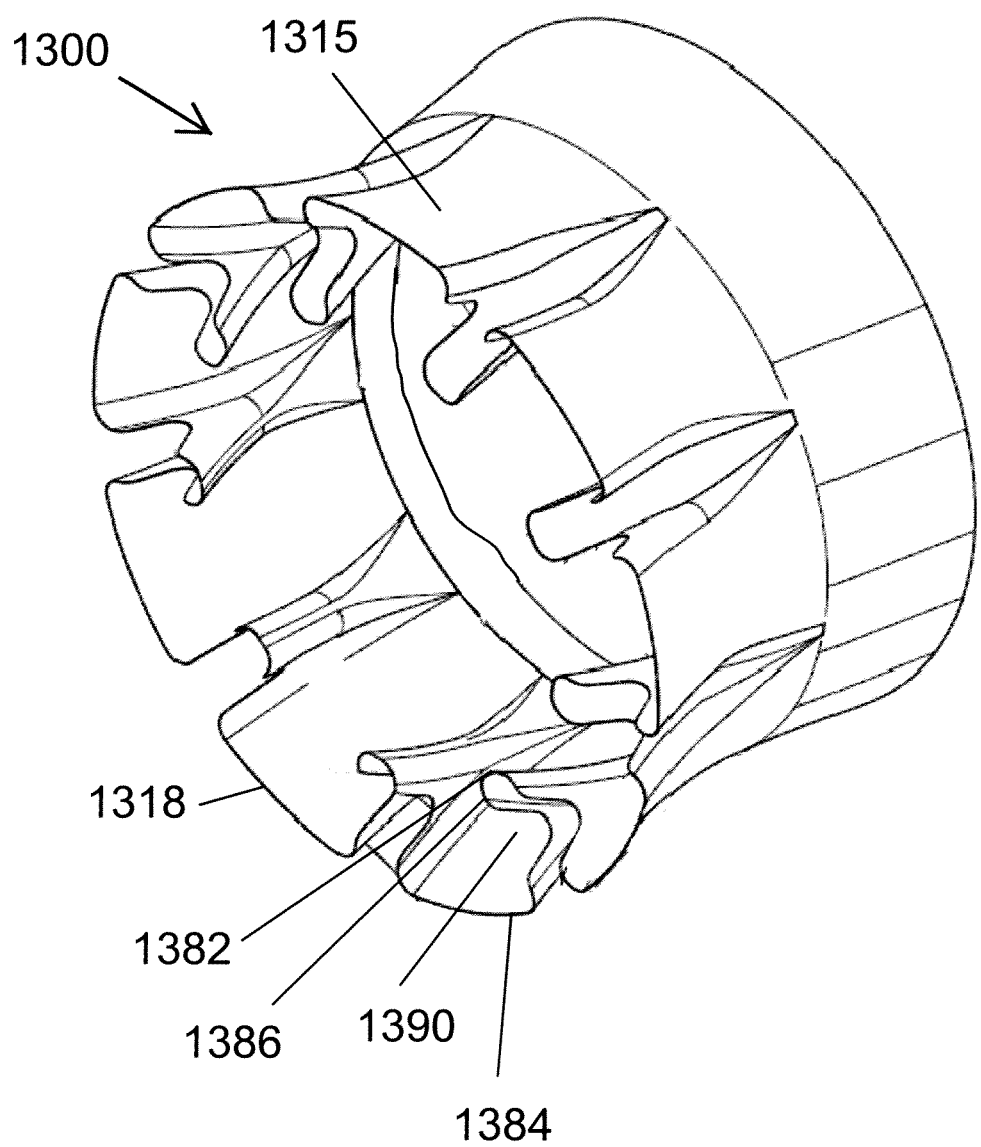
FIG. 13 is a rear perspective view of a another embodiment of a shroud with mixing lobes. The mixing lobes have triangular "cutouts" in the sidewalls instead of having full sidewalls.

In other embodiments as exemplified in FIG. 13, the mixing lobes do not have full sidewalls. In FIG. 13, only one shroud 1300 is shown for purposes of clarity. This shroud also has mixing lobes 1315. The trailing edge 1318 has a circular crenellated shape which can be described as being formed from inner arcuate portions 1382, outer arcuate portions 1384, and radially extending portions 1386 as with FIG. 12. Here, there are "cutouts" 1390 in the sidewalls of the mixing lobes. Put another way, the radially extending portions 1386 of the trailing edge 1318 are not straight, but are bent. As a result, fluid flowing through the mixing lobes can flow both axially and transversely. Here, the cutouts 1390 have a triangular shape.

Figure 15:
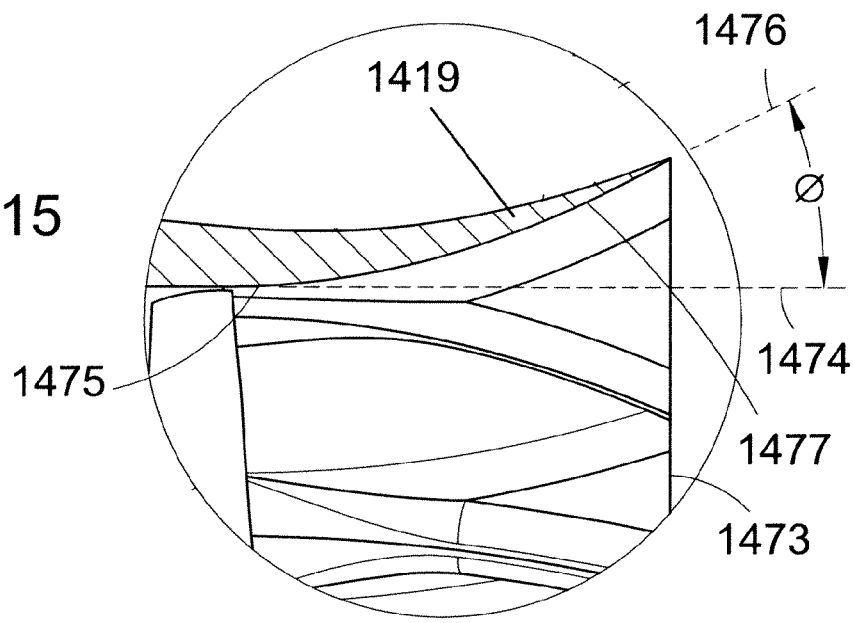
FIG. 15 is a magnified view of an outward mixing lobe.
Figure 14:
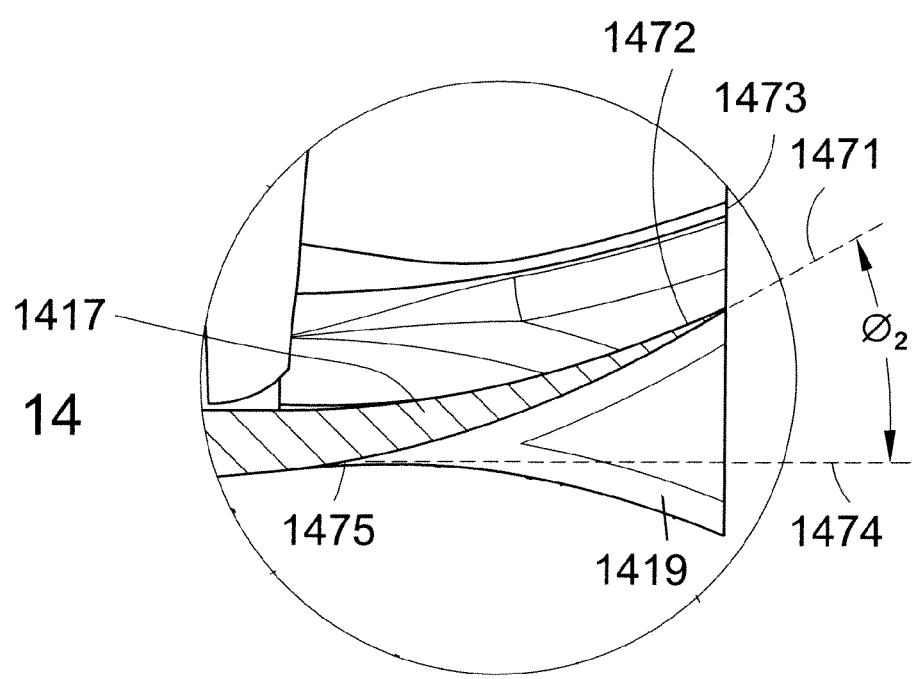
FIG. 14 is a magnified view of an inward mixing lobe.

The number of mixing lobes can be between 6 and 28. The height-to-width ratio of the lobe channels will be between 0.5 and 4.5. FIG. 14 and FIG. 15 are magnified view of mixing lobes and are useful for explaining the angles of the mixing lobes. The discussion of these angles applies equally to mixing lobes on the turbine shroud or mixing lobes on the ejector shroud. The angles of the mixing lobes is independently determined for each shroud.

Referring now to FIG. 14, a tangent line 1471 is drawn along the interior trailing edge indicated generally at 1472 of an inward mixing lobe 1417. A rear plane 1473 of a shroud 1410 is present. A line 1474 is formed normal to the rear plane 1473 and tangent to the point 1475 where an outward mixing lobe 1419 and an inward mixing lobe 1417 meet. An angle $\emptyset_2$ is formed by the intersection of tangent line 1471 and line 1474. This angle $\emptyset_2$ is between 5 and 65 degrees. Put another way, an inward mixing lobe 1417 forms an angle $\emptyset_2$ between 5 and 65 degrees relative to a longitudinal axis of the turbine shroud 1410. In particular embodiments, the angle $\emptyset_2$ is from about 35° to about 50°.

In FIG. 15, a tangent line 1476 is drawn along the interior trailing edge indicated generally at 1477 of the outward mixing lobe 1419. An angle $\emptyset$ is formed by the intersection of tangent line 1476 and line 1474. This angle $\emptyset$ is between 5 and 65 degrees. Put another way, an outward mixing lobe 1419 forms an angle $\emptyset$ between 5 and 65 degrees relative to a longitudinal axis of the turbine shroud 1410. In particular embodiments, the angle $\emptyset$ is from about 35° to about 50°.

Figure 16:
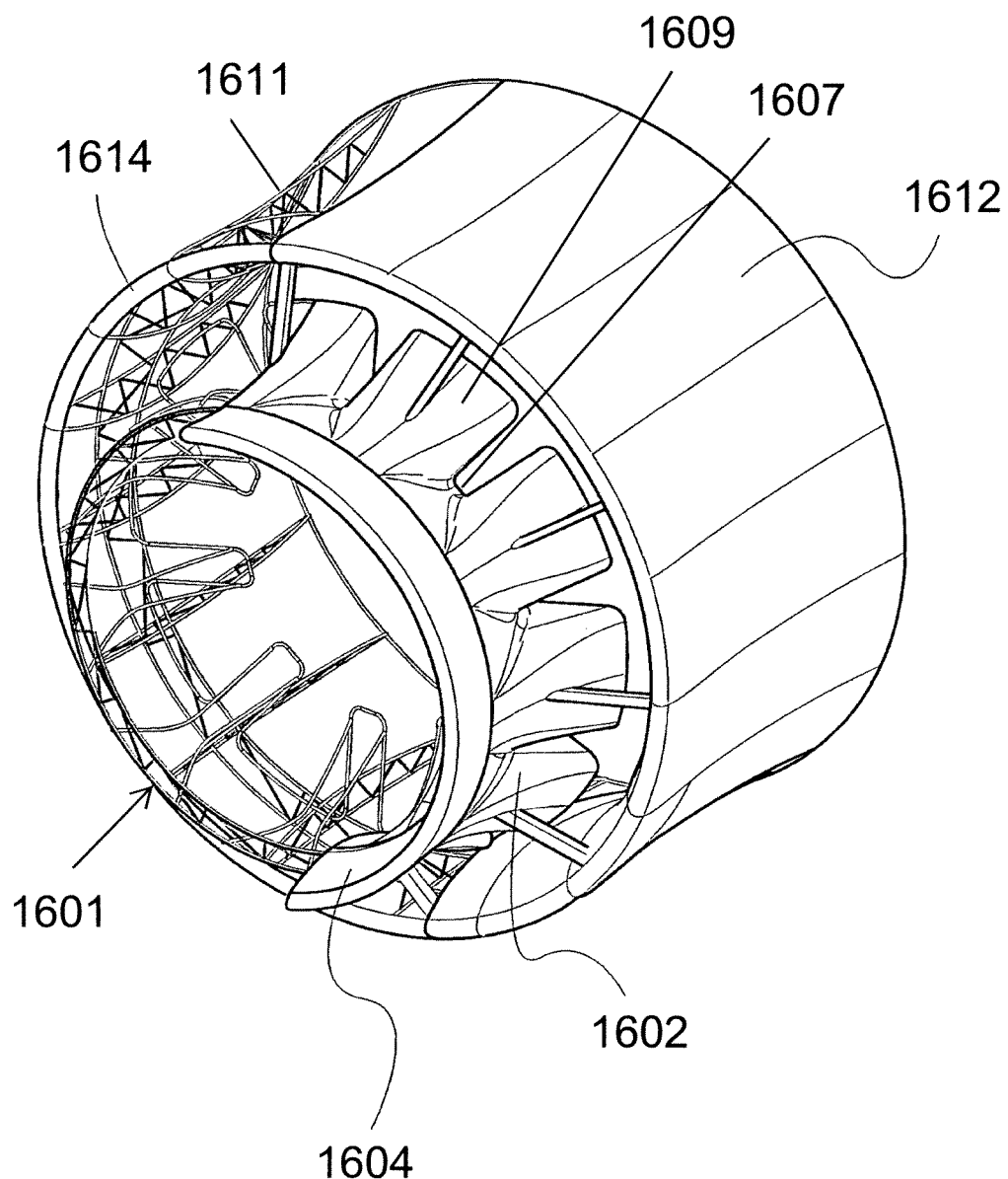
FIG. 16 is an example of a frame-and-skin construction for the shroud.

Generally, the shrouds of the shrouded fluid turbine are made using various polymeric films or fabrics (i.e. skin) that are stretched over a frame. FIG. 16 illustrates one such construction. A turbine skin 1602 partially covers a turbine shroud frame 1601. An ejector skin 1612 partially covers an ejector shroud frame 1611. The stretching of the turbine skin 1602 over the frame 1601 forms the mixing lobes 1605. There are two sets of mixing lobes, inward mixing lobes 1607 that extend inwards toward the central axis of the turbine, and outward mixing lobes 1609 that extend outwards away from the central axis. The inlet end 1604, 1614 of the two shrouds is shown here as a larger, more rigid member compared to the rest of the frame.

Figure 17A:
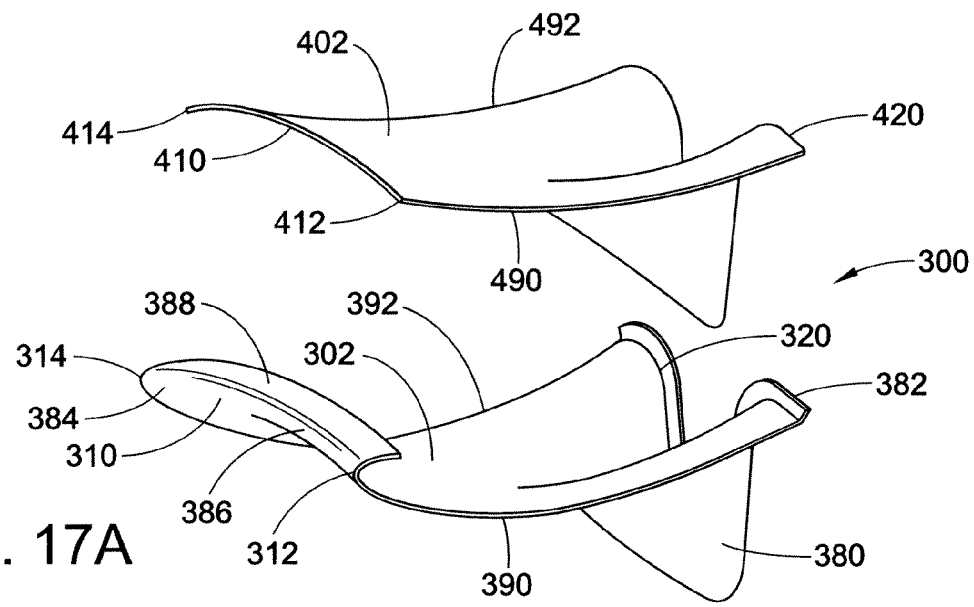
FIGS. 17A-17C are views of an exemplary hard shell-and-membrane construction for the shroud.
Figure 17B:
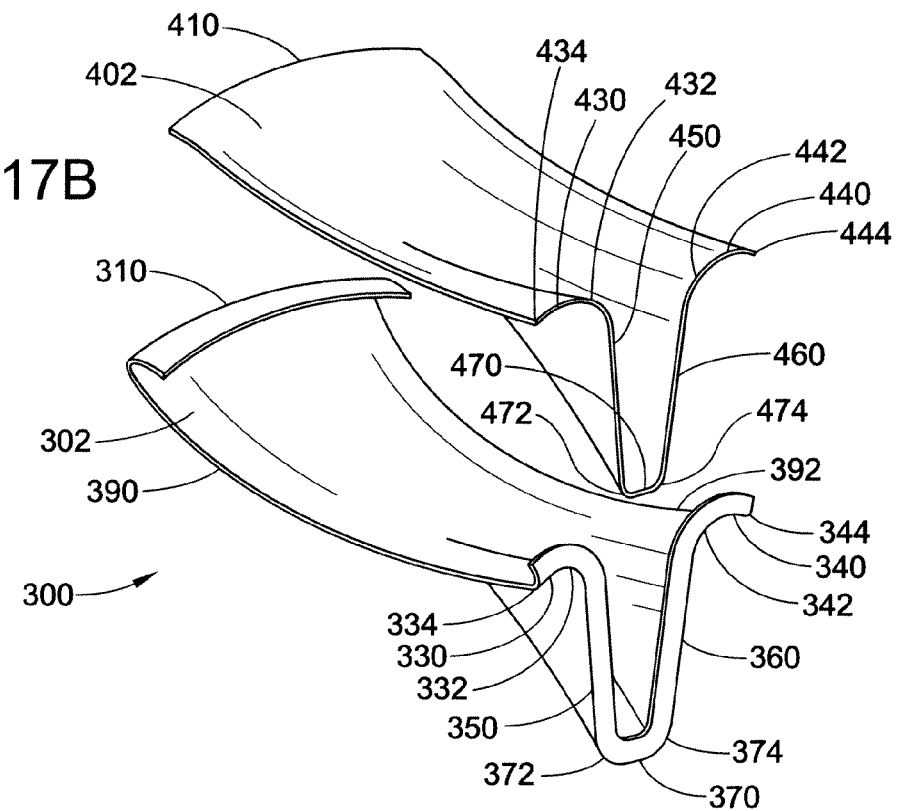
Figure 17C:
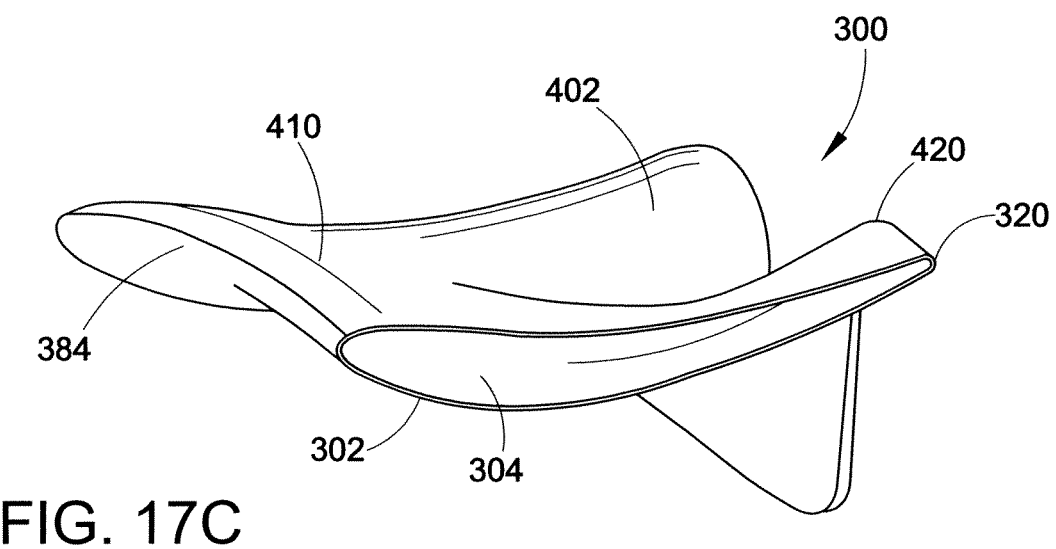

FIGS. 17A-17C show another similar construction. Here, the shroud is made from a combination of a hard shell (i.e. frame) and a membrane (i.e. skin). This construction generally allows the shroud to have reduced weight compared to a shroud made entirely of the hard shell material because the membrane material has a lower density than the hard shell material. The reduced weight has several advantages, including allowing the use of less substantial supports and reducing transportation costs. The discussion here refers to forming a shroud segment like that shown in FIG. 10, but is adaptable to a complete shroud as well, or to a lobe segment that forms both the leading edge and the trailing edge of the shroud (see FIG. 5).

The shroud segment 300 is formed from two pieces, a hard shell member 302 and a membrane 402. The hard shell member 302 has an arcuate front edge 310 and a rear edge 320. The term "edge" should not be construed herein as referring to a two-dimensional line. As seen here, the front edge 310 and the rear edge 320 are rounded. The front edge 310 has a first end 312 and a second end 314.

The rear edge 320 can be considered as including a first outer edge 330, a second outer edge 340, a first radial edge 350, a second radial edge 360, and an inner edge 370. The first outer edge 330 and the second outer edge 340 are located in an outer plane. As will be shown later, that outer plane may appear to be generally cylindrical depending on the perspective. The inner edge 370 is located in an inner plane, which may also appear to be generally cylindrical depending on the perspective. The first outer edge 330 has an interior end 332 and an exterior end 334. Similarly, the second outer edge 340 has an interior end 342 and an exterior end 344. In particular embodiments, the first outer edge and the second outer edge are of substantially the same length. The distance between the first outer edge interior end 332 and the second outer edge interior end 342 is less than the distance between the first outer edge exterior end 534 and the second outer edge exterior end 544.

The first radial edge 350 extends from a first end 372 of the inner edge 370 to the interior end 332 of the first outer edge 330. Similarly, the second radial edge 360 extends from a second end 374 of the inner edge 370 to the interior end 342 of the second outer edge 340. The resulting rear edge 320 could be described as having a partial castellated or crenellated shape, or as having a shape similar to a capital letter V when written in cursive D'Nealian script.

An interior face 380 extends from the front edge 310 to the rear edge 320. The interior face 380 forms the interior of the resulting fluid turbine shroud. Put another way, the interior face is on the low suction side of the shroud. The lateral edges 390, 392 of the interior face are cambered to form an airfoil shape.

A rear lip 382 is present on the rear edge 320 and transverse to the interior face 380. Similarly, a front lip 384 is present on the front edge 310 and transverse to the interior face 380. Both the front lip 384 and the rear lip 382 extend away from the interior face 380. The front lip 384 can also be described as having a first surface 386 that is transverse to the interior face and a second surface 388 that curls over the interior face.

The membrane 402 can also be considered as having a front edge 410, a rear edge 420, a first lateral edge 490, and a second lateral edge 492. The front edge 410 has a first end 412 and a second end 414. The rear edge 420 can be considered as including a first outer edge 430, a second outer edge 440, a first radial edge 450, a second radial edge 460, and an inner edge 470. The first outer edge 430 and the second outer edge 440 are located in an outer plane. The inner edge 470 is located in an inner plane. The first outer edge 430 has an interior end 432 and an exterior end 434. Similarly, the second outer edge 440 has an interior end 442 and an exterior end 444. In particular embodiments, the first outer edge 430 and the second outer edge 440 are of substantially the same length. The distance between the first outer edge interior end 432 and the second outer edge interior end 442 is less than the distance between the first outer edge exterior end 434 and the second outer edge exterior end 444.

The first radial edge 450 extends from a first end 472 of the inner edge 470 to the interior end 432 of the first outer edge 430. Similarly, the second radial edge 460 extends from a second end 474 of the inner edge 470 to the interior end 442 of the second outer edge 440. The resulting rear edge 420 can also be described as having a partial castellated or crenellated shape. The two lateral edges 490, 492 extend from the front edge 410 to the rear edge 420.

FIG. 17C shows the hard shell member 302 and the membrane 402 assembled to form the shroud segment 300. The front edge 410 of the membrane 402 is connected to the front lip 384 of the hard shell member 302. The rear edge 420 of the membrane 402 is connected to the rear lip 320 of the hard shell member 302. The lateral surfaces 304, 306 of the shroud segment, formed between the hard shell member and the membrane, have a cambered airfoil shape.

The frame/hard shell member is formed from a rigid material. In this regard, the terms "hard" and "rigid" are relative to the skin/membrane. Rigid materials include, but are not limited to, polymers, metals, and mixtures thereof. Other rigid materials such as glass reinforced polymers may also be employed. Rigid surface areas around fluid inlets and outlets may improve the aerodynamic properties of the shrouds. The rigid surface areas may be in the form of panels or other constructions.

The skin/membrane portion(s) of the shroud allows the exterior surface to be manufactured easily, and allows the exterior surface to be easily replaced as well. In addition, the membrane can flex, reducing buildup of ice or snow on the shroud.

The skin/membrane may be generally formed of any polymeric film or fabric material. Exemplary materials include polyvinyl chloride (PVC), polyurethane, polyfluoropolymers, and multi-layer films of similar composition. Stretchable fabrics, such as spandex-type fabrics or polyurethane-polyurea copolymer containing fabrics, may also be employed.

Polyurethane films are tough and have good weatherability. The polyester-type polyurethane films tend to be more sensitive to hydrophilic degradation than polyether-type polyurethane films. Aliphatic versions of these polyurethane films are generally ultraviolet resistant as well.

Exemplary polyfluoropolymers include polyvinyldidene fluoride (PVDF) and polyvinyl fluoride (PVF). Commercial versions are available under the trade names KYNAR® and TEDLAR®. Polyfluoropolymers generally have very low surface energy, which allow their surface to remain somewhat free of dirt and debris, as well as shed ice more readily as compared to materials having a higher surface energy.

The skin/membrane may be reinforced with a reinforcing material. Examples of reinforcing materials include but are not limited to highly crystalline polyethylene fibers, paramid fibers, and polyaramides.

The skin/membrane may independently be multi-layer, comprising one, two, three, or more layers. Multi-layer constructions may add strength, water resistance, UV stability, and other functionality. However, multi-layer constructions may also be more expensive and add weight to the overall fluid turbine.

Film/fabric composites are also contemplated along with a backing, such as foam.

One advantage to the use of a skin and frame/hard shell member and membrane type construction relates to ease of manufacture. In particular, shrouds including mixing lobes have complex surfaces, with alternating concave and convex surface sections. The use of a flexible skin/membrane allows the transition between concave and convex surface sections to be smooth, and allows the surface to be made easily by simply connecting the membrane to the front and rear edges of the hard shell member. The membrane and the hard shell member can be connected to each other using fasteners, adhesives, etc. known to those of ordinary skill in the art.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A shrouded axial flow fluid turbine comprising:
a turbine shroud having a leading edge and a trailing edge, the turbine shroud forming an open passageway;
an ejector shroud having a leading edge and a trailing edge; and
means for extracting energy from a high-energy fluid stream;
wherein the means for extracting energy is disposed in an annulus formed between the turbine shroud and the ejector shroud; and
wherein a first plurality of mixing lobes is located along the trailing edge of either the turbine shroud or the ejector shroud such that the trailing edge has a circular crenellated shape.

2. The shrouded fluid turbine of claim 1, wherein the leading edge of the turbine shroud is substantially coplanar with the leading edge of the ejector shroud.

3. The shrouded fluid turbine of claim 1, wherein the turbine shroud has a radius; the annulus has a height measured from the turbine shroud to the ejector shroud; and the turbine shroud radius is equal to or greater than the annular height.

4. The shrouded fluid turbine of claim 1, wherein the trailing edge of the turbine shroud is downstream of the trailing edge of the ejector shroud.

5. The shrouded fluid turbine of claim 1, wherein the trailing edge of the ejector shroud is downstream of the trailing edge of the turbine shroud.

6. The shrouded fluid turbine of claim 1, wherein the first plurality of mixing lobes is located along the trailing edge of the turbine shroud.

7. The shrouded fluid turbine of claim 6, wherein the ejector shroud has a ring airfoil shape, with the low pressure side being on the interior of the ejector shroud.

8. The shrouded fluid turbine of claim 6, wherein the ejector shroud further comprises a second plurality of mixing lobes such that the trailing edge of the ejector shroud has a circular crenellated shape.

9. The shrouded fluid turbine of claim 1, wherein the first plurality of mixing lobes is located along the trailing edge of the ejector shroud.

10. The shrouded fluid turbine of claim 9, wherein the turbine shroud has a ring airfoil shape, with the low pressure side being on the interior of the turbine shroud.

11. The shrouded fluid turbine of claim 1, wherein the means for extracting energy comprises (i) stator vanes extending between the turbine shroud and the ejector shroud; and (ii) a rotor downstream of the stator vanes.

12. The shrouded fluid turbine of claim 11, wherein the rotor comprises a ring having a plurality of permanent magnets arranged to form a Halbach cylinder that produces a magnetic field; and wherein the means for extracting energy further comprises at least one phase winding.

13. The shrouded fluid turbine of claim 12, wherein the permanent magnets comprise $Nd_2Fe_{14}B$, $SmCo_5$, or $SmCo_7$.

14. The shrouded fluid turbine of claim 1, wherein the ejector shroud is a discontinuous airfoil comprising a continuous forward ring and a plurality of shroud segments, the shroud segments being placed circumferentially around the forward ring with spaces between adjacent shroud segments, the shroud segments defining the trailing edge of the ejector shroud.

15. The shrouded fluid turbine of claim 1, wherein the mixing lobes have full sidewalls.

16. The shrouded fluid turbine of claim 1, wherein the mixing lobes have sidewalls with cutouts.

17. A shrouded axial flow fluid turbine comprising:
a turbine shroud having a leading edge and a trailing edge, the turbine shroud forming an open passageway;
an impeller surrounding the turbine shroud; and
an ejector shroud having a leading edge and a trailing edge, the ejector shroud surrounding the impeller;
wherein the leading edge of the turbine shroud is substantially coplanar with the leading edge of the ejector shroud; and
wherein a plurality of mixing lobes is located along the trailing edge of either the turbine shroud or the ejector shroud such that the trailing edge has a circular crenellated shape.

18. The shrouded fluid turbine of claim 17, wherein the turbine shroud has a radius; the impeller has a height; and the turbine shroud radius is equal to or greater than the impeller height.

19. The shrouded fluid turbine of claim 17, wherein the impeller is a permanent ring generator.

20. The shrouded fluid turbine of claim 17, wherein the mixing lobes have full sidewalls.

* * * * *